US005390035A

United States Patent [19]
Kasson et al.

[11] Patent Number: 5,390,035
[45] Date of Patent: Feb. 14, 1995

[54] METHOD AND MEANS FOR TETRAHEDRON/OCTAHEDRON PACKING AND TETRAHEDRON EXTRACTION FOR FUNCTION APPROXIMATION

[75] Inventors: James M. Kasson, Menlo Park; Wilfred E. Plouffe, Jr., San Jose, both of Calif.

[73] Assignee: International Business Machines Corporation, Armonk, N.Y.

[21] Appl. No.: 996,805

[22] Filed: Dec. 23, 1992

[51] Int. Cl.$^6$ .............................. H04N 1/46
[52] U.S. Cl. ...................... 358/518; 358/523; 358/525
[58] Field of Search .......... 358/518, 520, 523, 525; 395/109, 123; 364/723

[56] References Cited

U.S. PATENT DOCUMENTS

| | | |
|---|---|---|
| 4,075,663 | 2/1978 | Wellendorf. |
| 4,275,413 | 6/1981 | Sakamoto et al. ............ 358/525 |
| 4,334,240 | 6/1982 | Franklin ..................... 358/525 |
| 4,350,996 | 9/1982 | Rosenfeld. |
| 4,456,924 | 6/1984 | Rosenfeld. |
| 4,462,083 | 7/1984 | Schwefel. |
| 4,463,374 | 7/1984 | Thompson. |
| 4,464,677 | 8/1984 | Kuhn et al.. |
| 4,468,693 | 8/1984 | Fujita et al.. |
| 4,477,833 | 10/1984 | Clark et al. ................. 358/525 |
| 4,500,919 | 2/1985 | Schreiber. |
| 4,511,989 | 4/1985 | Sakamoto .................... 364/723 |
| 4,561,016 | 12/1985 | Jung et al.. |
| 4,639,770 | 1/1987 | Jung et al.. |
| 4,670,780 | 6/1987 | McManus et al.. |
| 4,717,954 | 1/1988 | Fujita et al.. |
| 4,729,098 | 3/1988 | Cline et al.. |
| 4,751,742 | 6/1988 | Meeker. |
| 4,758,885 | 7/1988 | Sasaki et al.. |
| 4,780,756 | 10/1988 | Shiota et al.. |
| 4,805,013 | 2/1989 | Dei et al.. |
| 4,829,587 | 5/1989 | Glazer et al.. |
| 4,837,613 | 6/1989 | Paxton et al.. |

(List continued on next page.)

FOREIGN PATENT DOCUMENTS 2-206973 2/1990 Japan.
2-226869 2/1990 Japan.
1595122 8/1981 United Kingdom.

OTHER PUBLICATIONS

"Color Correction Technique for Hard Copies by 4—Neighbors Interpolation Method", Kanamori et al., Journal of Imaging Science and Technology, vol. 36, No. 1, Jan.–Feb. 1992, pp. 73–80.

(List continued on next page.)

*Primary Examiner*—Scott A. Rogers
*Attorney, Agent, or Firm*—Baker, Maxham, Jester & Meador

[57] ABSTRACT

The invention concerns the conversion of an input color to an output color using a multi-variable function having an input domain in a first three-dimensional color space and output range in a second m-dimensional color space. The conversion from input to output color subdivides the input domain into polyhedra defined by planar grids of points connected to form a plurality of triangles. The planar grids are projected into the remaining dimension of the function domain. When an input color value is presented, the multi-variable function is used to approximate the input value by computing an approximation of the multi-variable function, which provides a value in the output range. A tetrahedron containing the input color value is extracted from the function domain. The values of the multi-variable function at the tetrahedron vertices are obtained by interpolation. The tetrahedron is subdivided into subtetrahedra. The volumes of the subtetrahedra are calculated and multiplied by the function values. The products are added together and normalized to the volume of the extracted tetrahedron to produce an approximation of the input color. The approximation is provided as the value of the output color.

7 Claims, 18 Drawing Sheets

U.S. PATENT DOCUMENTS

| | | | |
|---|---|---|---|
| 4,837,722 | 6/1989 | Sara | 364/723 |
| 4,839,721 | 6/1989 | Abdulwahab et al. . | |
| 4,839,722 | 6/1989 | Barry et al. . | |
| 4,862,255 | 8/1989 | Takanaski et al. . | |
| 4,864,357 | 9/1989 | Matsunawa et al. . | |
| 4,876,509 | 10/1989 | Perlmutter . | |
| 4,879,594 | 11/1989 | Stansfield et al. . | |
| 4,893,181 | 1/1990 | Yeomans . | |
| 4,894,794 | 1/1990 | Shenk . | |
| 4,901,258 | 2/1990 | Akiyama . | |
| 4,941,038 | 7/1990 | Walowit . | |
| 4,941,039 | 7/1990 | E'Errico . | |
| 4,945,500 | 7/1990 | Deering . | |
| 4,959,711 | 9/1990 | Hung et al. | 358/523 |
| 4,972,329 | 11/1990 | Breger . | |
| 4,974,069 | 11/1990 | Shimomura . | |
| 4,992,861 | 2/1991 | D'Errico . | |
| 4,992,862 | 2/1991 | Gabor . | |
| 5,001,651 | 3/1991 | Rehme et al. . | |
| 5,025,404 | 6/1991 | Jannssen et al. . | |
| 5,025,405 | 6/1991 | Swanson . | |
| 5,054,097 | 10/1991 | Flinois et al. . | |
| 5,055,923 | 10/1991 | Kitagawa et al. . | |
| 5,065,234 | 11/1991 | Hung et al. | 358/523 |
| 5,072,305 | 12/1991 | Numakura et al. . | |
| 5,077,604 | 12/1991 | Kivolowitz et al. . | |
| 5,097,518 | 3/1992 | Scott et al. . | |
| 5,101,283 | 3/1992 | Seki et al. . | |
| 5,111,286 | 5/1992 | MacDonald et al. . | |
| 5,222,202 | 6/1993 | Koyamada | 395/123 |
| 5,241,373 | 8/1993 | Kanamori et al. | 358/518 |

OTHER PUBLICATIONS

"The Gamut of Real Surface Colours", M. R. Pointer, Research Division, Kodak Limited, Color Research Application, vol. 5, No. 3, Fall 1980, pp. 145–155.

"A Novel Color Transformation Algorithm And It's Application" by Katsuhiro et al.; Image Processing Algorithm and Tech.; vol. 1244; 1990.

METHOD AND MEANS FOR TETRAHEDRON/OCTAHEDRON PACKING AND TETRAHEDRON EXTRACTION FOR FUNCTION APPROXIMATION

BACKGROUND OF THE INVENTION

1. Field of the Invention

This invention relates generally to methods for evaluating mathematical functions of many variables, and more specifically to a method for packing and extracting tetrahedra and octahedra within a function domain to approximate the value of a continuous multivariable function.

2. Description of the Prior Art

Many modern-day processes require the evaluation of one or more mathematical functions. These functions frequently involve a multiplicity of variables interrelated by relatively complex mathematical expressions. Oftentimes, the overall efficiency of a process is determined by the relative ease or difficulty with which a function may be evaluated. For instance, in the field of color imaging, it is often desired to convert a color image from a first color space to a second color space. The first color space may be for an image representation stored in a computer file, and the second color space may be for specification of color created on paper by means of printer inks.

During the implementation of a process, it is generally more important to provide an efficient function evaluation technique, as opposed to providing a function evaluation technique optimized for maximum accuracy. For example, during the process of color image conversion, a quick, expedient evaluation of color image functions is much more important than a completely accurate representation of the converted color image. Efficiency is of paramount importance in this context because a common design goal of many image processing systems is to provide rapid processing capability. Accuracy is not a critical design parameter because the human eye cannot distinguish or compensate for minor imaging errors. The characteristics of human visual perception generally allow for the existence of a known bounded error in image rendering. Although the importance of efficiency relative to accuracy has been described in conjunction with color imaging systems, a similar situation exists across a broad spectrum of other process applications as well.

In some process applications, the output of a function may be sampled, but the function itself is unknown. For example, consider the conversion of an image from the color space of a computer file to the surface of a newspaper. The actual colors produced by the printing ink interacting with the paper are difficult or impossible to accurately quantify. The factors resulting in the appearance of a given color on paper are represented by an unknown function, even though the value of the function can be sampled at various intervals. In this scenario, an accurate representation of the imaging information is not at all critical, and emphasis may instead be placed on data processing speed.

Many existing processes involve mathematical functions having extensive domains. It is generally impractical to sample the output of the function at all possible sample values. For example, FIG. 1 illustrates the domain of a mathematical function representing the color of an object in the context of a color image processing system. State of the art color imaging systems represent a color image as a regular array of spots, generally referred to as pixels. Each pixel is assigned a color represented by the coordinates of the color in a three dimensional space. In an additive color environment (i.e., a cathode-ray tube display), any color may be represented by a given combination of the three primary colors of red, green, and blue. With reference to FIG. 1, the value of red may be represented along the X axis 12, green along the Y axis 14, and blue along the Z axis 16. Each coordinate may be of arbitrary precision, but coordinates are generally represented using 8-bit values. In this manner, each pixel may be assigned one of $2^{24}$ different colors. Therefore, the domain of the mathematical function representing pixel color is quite extensive.

The mathematical function accepts input values within the domain of the function, and produces output values corresponding to the input values. The sequence of mathematical operations carried out by the function are determined by the process to be implemented. To print a color image displayed on a cathode-ray tube, the image must be converted from additive to subtractive form. As previously described, the cathode-ray tube image is stored as a pixel-by-pixel representation specifying particular quantities of the colors red, green, and blue. For subtractive color applications, such as printing, the three primary colors are cyan (blue-green), magenta, and yellow with black used as an additional or optional color for increased density (darkness) or decreased total ink usage. Accordingly, a function must be determined for the purpose of converting pixel color representations into known quantities of colored printer inks, typically with the amount expressed as an integer in the range of 0 to 255 for each of cyan, magenta, yellow, and black. The function accepts input values for the variables red, green, and blue, and produces output values which represent quantities of cyan, magenta, yellow, and black. Other color spaces in use as either input or output spaces include the colorimetric spaces which represent color based on the tristimulus values that represent a standard observer as defined by the Commission Internationale de l'Eclairage. CIE L*a*b*, CIE L*u*v*, and CIE XYZ are three spaces.

For many processes, it is highly impractical to define a function in analytical form. In the context of color image conversion, it would be very difficult to develop a working analytical model for the purpose of converting a cathode-ray tube image representation into a form suitable for color printing on newspaper media. If the printer inks offered a perfectly linear response, and if the paper was perfectly white, then the function for the conversion of the color image could be specified analytically. However, as a practical matter, the inks have a nonlinear response, and the paper is off-white. Consequently, the print function is best represented by using measurements accumulated for a plurality of print samples. There are $2^{24}$ points in the domain of the print color function which could be sampled, so it would be prohibitively time-consuming and storage-intensive to measure and store all of these values. Rather, the function may be approximated using a smaller set of measured domain values (sample points), and using interpolation to compute the approximate values for all of the other domain values.

FIG. 1 illustrates the concept of taking sample points at regularly-spaced intervals throughout the display-color space, which is the domain of the print-color function. Each sample point is represented by an ordered triplet (R, G, B) which corresponds to values along the red (R), green (G), and blue (B) axes of display-color space. In the present example, samples are taken at points 18, 20, 22, 24, 26, 28, 30, 32, 34, 36, 38, 40, 42, 44, 46, and 48. Accordingly, the sample points form a rectangular grid throughout the domain of the function, such that the rectangular grid is comprised of a plurality of rectangular volumes 10.

Many existing linear interpolation techniques store the coordinates of the sample points 18, 20, 22, 24, 26, 28, 30, 32, 34, 36, ! 38, 40, 42, 44, 46, and 48 in one or more interpolation tables. The interpolation tables associate each domain sample point coordinate with a function range output value. The domain sample points are generally situated in a first color space, such as red-green-blue, whereas the range output values are situated in a second color space, such as cyan-magenta-yellow.

The accuracy of a given interpolation technique is determined in part by the size of the interpolation tables. In approximating a continuous function, increasing the number of entries in the tables and decreasing the distance between the entries can be used to provide virtually any desired level of function approximation accuracy. However, this approach to increasing system accuracy is very expensive in practice. Table storage and table indexing structures consume large blocks of memory, especially in the context of three-or higher-dimensional functions. Accordingly, it would be desirable to develop an approximating technique which produces accurate answers with relatively small tables.

The overall efficiency of a given approximation technique is often determined by the complexity of mathematical calculations required to perform an approximation. The cost of performing the calculations necessary to produce the result should be minimized. Many prior art systems require the implementation of numerous memory access operations to read table values from a relatively high number of memory locations. One way to minimize the complexity of the mathematical calculations is to reduce the number of locations in the table which the approximation equipment uses to compute the result. By contrast, the complexity of the calculations required to load the interpolation tables is generally not critical. The loading of the interpolation table is carried out infrequently as compared with the number of times the table is used to approximate the function. Therefore, it would be desirable to develop an interpolation technique which minimizes the cost of performing the calculations and the number of memory locations which must be accessed, even if the computational complexity of loading the interpolation table is increased.

State of the art function approximation techniques produce answers which are slightly in error. For system applications such as color image processing, these small errors are generally acceptable. However, some approximation techniques produce discontinuous results in the output range of the function when the domain is presented with continuous input points. Such discontinuous results may produce visible artifacts, because the human eye is more sensitive to differences in color and/or intensity than it is to the absolute value of color and/or intensity. If the magnitude of the discontinuity produced by the approximating scheme exceeds the just-noticeable difference, visible contours will appear in the areas of the image that are supposed to be perfectly smooth. Consequently, it would be desirable to develop an efficient function approximation technique which provides a continuous range output in response to a continuous domain input.

Presently existing function approximation techniques which utilize interpolation tables may be categorized by considering the manner in which the techniques perform each of three subfunctions. The subfunctions are (1) the subdivision of the function domain to select sample domain input: points, (2) the extraction of appropriate sample domain input points corresponding to an arbitrarily selected point from within the function domain, and (3) the actual mathematical interpolation process.

The operation of selecting sample points in the continuous input domain of the function can be termed packing or subdividing. The function is evaluated at these sample points and the evaluation results are saved in a table for subsequent utilization by an interpolation process. The selection of sample points often has a geometrical interpretation: it may be conceptualized as the division of the input domain of the function into a set of contiguous n-dimensional polyhedrons, with the sample points being represented as the polyhedron vertices. For example, a function domain consisting of a three-dimensional rectangular solid can be subdivided into a set of rectangular solids along three mutually orthogonal sets of parallel planes.

Although the division of the function domain into rectangular volumes is a common technique employed by many existing interpolation techniques, it is not an absolute requirement. The function domain may be divided into volumes having nonrectangular geometrical configurations to enhance the efficiency of the interpolation technique in the context of specific system applications. Furthermore, the packing need not be conducted at regular intervals. For example, it may be advantageous to use smaller rectangular solids in areas of the function domain having relatively high amounts of curvature. However, it is necessary that the collection of solids chosen for packing be non-overlapping and completely fill the portion of the function domain for which approximations are desired.

The process of selecting a small number of sample points to be used in computing a given approximation can be termed extraction. Since the sample points typically represent polyhedra vertices, extraction refers to the process of identifying the polyhedron containing the arbitrarily selected point for which an approximation is desired. The arbitrarily selected point may be called the target evaluation point. In the context of an interpolation scheme utilizing tables, the extraction process generally involves extracting the desired function values from a table. The desired function values are the function values at the coordinates of the vertices of the extracted polyhedron.

After the processes of subdivision and extraction have been implemented, the actual interpolation process is conducted. The interpolation operation takes the sample points extracted from the table and uses the function value at these points together with the coordinates of the target evaluation point as inputs for a process which produces the approximate value of the function.

One prior art technique for converting selected points in the domain of a function to values in a function range is known as trilinear interpolation. In the environment of a function, F, having a three-dimensional input domain, the domain is completely filled with rectangular solids. This process is implemented by selecting a series of points along each axis, for example, the x, y, and z axes, as follows: $(x_0, x_1, x_2, \ldots x_a)$, $(y_0, y_1, y_2, \ldots y_b)$, and $(z_0, z_1, z_2, \ldots z_c)$. These series are chosen such that $x_i = x_0 + i*(x_a - x_0)/a$, $y_j = y_0 + j*(y_b - y_0)/b$, and $z_k = z_0 + k*(z_c - z_0)/c$. In this manner, the sample points are $(x_i, y_j, z_k)$ for $0 \leq i \leq a$, $0 \leq j \leq b$, and $0 \leq k \leq c$. Prior to the step of function approximation, the value of the function F(x,y,z) is measured at each of these sample points.

To approximate the function at a target evaluation point (r,s,t) selected from the input domain of the function, the following procedure is used. The function is approximated for the target point (r,s,t) as follows:

$$F(r,s,t) = (1.0 - d_r)\{(1.0 - d_s)\{(1.0 - d_t)F(x_i,y_j,z_k) +$$
$$d_t F(x_i,y_j,z_{k+1})\} + d_s\{(1.0 - d_t)F(x_i,y_{j+1},z_k) +$$
$$d_t F(x_i,y_{j+1},z_{k+1})\}\} + d_r\{(1.0 - d_s)\{(1.0 - d_t)F(x_{i+1},y_j,z_k) +$$
$$d_t F(x_{i+1},y_j,z_{k+1})\} + d_s\{(1 - d_t)F(x_{i+1},y_{j+1},z_k) +$$
$$d_t F(x_{i+1},y_{j+1},z_{k+1})\}\},$$

where
$x_i \leq r \leq x_{i+1}$, $y_j \leq s \leq y_{j+1}$, $z_k \leq t \leq z_{k+1}$
$d_r = (r-x_i)/(x_{i+1}-x_i)$
$d_s = (s-y_j)/(y_{j+1}-y_j)$
$d_t = (t-z_k)/(z_{k+1}-z_k)$ With reference to the formulas set forth above, the evaluation of the function at target evaluation point (r,s,t) requires the use of eight different sample points in the interpolation calculations. Furthermore, at least eight multiplications and seven additions are required per approximation. This interpolation process uses rectangular solids for packing, extracts the rectangular solid that encloses the target point, and uses trilinear interpolation of the eight vertices to calculate the approximation.

Some prior art interpolation systems improve upon the basic method of trilinear interpolation by storing values for $d_r$, $d_s$, and $d_t$, and/or values for various combinations of terms in the above formulas. However, even if some of the formula terms are calculated and stored in a table prior to function approximation, the overall computational efficiency of this trilinear interpolation method is limited by the fact that sample values for eight vertices must be used to calculate each approximation. An important factor in determining the overall effectiveness of linear interpolation methods is the packing technique used to divide the function domain. A packing technique which divides the function domain into geometrical volumes having a minimum number of vertices would greatly simplify the required calculations, as compared to the scheme described above which uses eight vertices per interpolation. What is needed is an improved packing technique for dividing the function domain into geometrical volumes. In this manner, the interpolation process will calculate a function approximation using a minimum number of sample points per calculation.

One exemplary prior art interpolation process which reduces the number of vertices required for a function approximation is described in U.S. Pat. No. 4,477,833 issued to Clark. For purposes of explanation, it is assumed that the function domain is partitioned into unit divisions in each dimension, such that $x_{i+1} - x_i = 1$. The domain packing algorithm of Clark uses rectangular solids in a manner substantially identical to that of the standard trilinear method described above. The polyhedral extraction algorithm disclosed in Clark returns four sample points per target evaluation point. The four sample points are a subset of the eight points returned in the standard trilinear method.

The four sample points used in the Clark method are chosen as follows for a target evaluation point (r,s,t). Let $(x_i, y_j, z_k)$ be the sample point such that $x_i \leq r \leq x_{i+1}$, $y_j \leq s \leq y_{j+1}$, and $z_k \leq t \leq z_{k+1}$. Define $d_r$ as $(r-x_i)/(x_{i+1}-x_i)$, $d_s$ as $(s-y_j)/(y_{j+1}-y_j)$, and $d_t$ as $(t-z_k)/(z_{k+1}-z_k)$. Then, $d_r$, $d_s$, and $d_t$ are used to determine the dominant component, i.e., the maximum d, and the second dominant component.

Define "primary" to be the vertex of the subcube enclosing the target point that corresponds to the dominant component, and primeWeight as follows: primary=$(x_{i+1}, y_j, z_k)$ and primeWeight=$d_r$ if $d_r > d_s$ and $d_r > d_t$; primary=$(x_i, y_{j+1}, z_k)$ and primeWeight=$d_s$ if $d_s > d_r$ and $d_s > d_t$; primary=$(x_i, y_j, z_{k+1})$ and primeWeight=$d_t$ if $d_t > d_r$ and $d_t > d_s$.

Define "secondary" as the corner adjacent to the primary and in the direction of the second dominant component. Consider the definition for primary=$(x_{i+1}, y_j, z_k)$ where $d_r$ is the dominant component. Secondary=$(x_{i+1}, y_{j+1}, z_k)$ secondWeight=$d_s$, and lastWeight=$d_t$ if $d_s > d_t$; Secondary=$(x_{i+1}, y_j, z_{k+1})$ secondWeight=$d_t$, and lastWeight=$d_s$ if $d_t > d_s$.

In accordance with the Clark patent, the approximation for the function value is calculated as follows:

$$F(r,s,t) = (1 - \text{primeWeight})*F(x_i, y_j, z_k) +$$
$$(\text{primeWeight} - \text{secondWeight})*F(\text{primary}) +$$
$$(\text{secondWeight} - \text{lastWeight})*F(\text{secondary}) +$$
$$\text{lastWeight}*F(x_{i+1}, y_{j+1}, z_{k+1}).$$

In this manner, the Clark process uses rectangular solids for packing the function domain. An extraction algorithm extracts four sample points, and a directional interpolation algorithm of the four sample points approximates the function value corresponding to a target evaluation point.

The Clark process yields approximation results which contain a certain amount of error. The extent of the error is partially dependent upon the particular extraction method employed, the nature of the function to be approximated, and the domain of interest. Therefore, in some applications, the Clark method may provide acceptable results, whereas, when applied to other applications, the Clark method may prove wholly unsatisfactory. What is needed is a function approximation method which utilizes the relatively low number of sample points employed by the Clark method, yet offers enhanced accuracy in applications where the Clark method would not be well-suited.

Another exemplary prior art is U.S. Pat. No. 4,275,413 issued to Sakamoto, et al, which describes a tetrahedral volumetric interpolation method for color correction. This method uses a domain packing algorithm similar to Clark. The extraction process returns 4 points, each of which is a vertex of the rectangular solid, or an average of 4 or 8 of the vertices of the rectangular solid. Their averaged points are the centers of a face of the rectangular solid (i.e., the average of 4 corners of a rectangle) or the center of the rectangular solid (i.e., the average of the 8 vertices of the rectangular solid).

SUMMARY OF THE INVENTION

The invention provides an improved technique for approximating the value of a multivariable function. The technique comprises three steps: a function domain packing step, a polyhedron extraction step, and a volumetric interpolation step. The technique is applied to a mathematical function to calculate an approximation for the function range output value at a point which has been selected from the input domain of the function.

The first step subdivides a function domain into polyhedra which form a hexagonal, close-packing structure. In the context of a function having three-dimensional input domain space with, for example, an x axis, a y axis and a z axis, the domain is divided into a plurality of naturally-occurring, regular tetrahedra and octahedra which represent the hexagonal close-packing structure. The vertices of the polyhedra comprise layers of sample points with the layers generated as follows.

Let the xy-plane be divided into a rectangular grid. Layer 1 is then defined as points on the xy-plane. The points with the (x,y) coordinates (i,j*sqrt(3)) are added to layer 1 for every integer i and j. Next, the points with the (x,y) coordinates (i+½,j*sqrt(3)+sqrt(3)/2) are added to layer 1 for every integer i and j.

Layer 2 is defined on the xy-plane as follows. The points with the (x,y) coordinates (i+½,j*sqrt(3)) are added to layer 2 for every integer i and j. Next, the points with the (x,y) coordinates (i,j*sqrt(3)+sqrt(3)/2) are added to layer 2 for every integer i and j.

The layers are placed into the three-dimensional space as alternating layers with a z coordinate offset of sqrt(⅔) and a y coordinate offset of ±1/(2*sqrt(3)). There are at least two possible procedures for defining the alternating layers.

In procedure 1, a close-packed hexagonal structure would be represented as a repeating structure of a first layer 1 on top of a first layer 2, which would be on top of a second layer 1, etc. The increment in the z coordinate would be sqrt(⅔) and the y coordinate offset between the first layer 1 and first layer 2 (second layer 1 and second layer 2, etc.) would be +½(2*sqrt(3)) and the y coordinate offset between the first layer 2 and second layer 1 (second layer 2 and third layer 1, etc.) would be −1/(2*sqrt(3)). An alternative structure would be represented in procedure 2 as repeating structure of a layer i on top of a layer 2, which would be on top of a layer 2, etc. The increment in the z coordinate would be sqrt(⅔) and the y coordinate offsets would be +1/(2*sqrt(3)).

The polyhedra are formed as follows. Consider any point in the interior of the function domain. For each such point, one of the following conditions is true:
1. The point lies on a straight line connected the two nearest sample points.
2. The point lies on the interior of an equilateral triangle formed by connecting the three nearest sample points.
3. The point lies in the interior of a rectangular tetrahedron formed by connecting the four nearest sample points.
4. The point lies in the interior of a regular octahedron formed from six sample points such that at least three of the points are the nearest sample points and the interior of the regular octahedron does not include any other sample points.

The plurality of all such regular tetrahedra and regular octahedra, as defined by conditions 3 and 4, completely fills the function domain. Each of the regular octahedra is further subdivided into 4 similar non-overlapping tetrahedra. Thus the plurality of all tetrahedra, regular tetrahedra and similar tetrahedra, completely fills the function domain.

Any rotation, scaling or skewing of this packing could also be used to pack the function domain with sample points.

A first alternative of the above procedure is defined where the function domain is bounded by the cube defined by the points (0,0,0) and (n,m,p) and the x axis, y axis and z axis. Let this area be filled by procedure 1, described above where the x coordinate is multiplied by ½, the y coordinate is multiplied by 1/sqrt(3), and the z coordinate is multiplied by sqrt(⅔). The sample points that must be provided are those sample points for any tetrahedron which includes at least part of the function domain. This scaling provides a repeating structure within a unit cube.

A second alternative of the above procedure is defined where the function domain is bounded by the cube defined by the points (0,0,0) and (n,m,p) and the x axis, y axis and z axis. Let this area be filled by procedure 2 described above where the x coordinate is multiplied by 1/6, the y coordinate is multiplied by 1/sqrt(27), and the z coordinate is multiplied by 1/sqrt(24). The sample points that must be provided are those sample points for any tetrahedron which includes at least part of the function domain. This scaling also provides a repeating structure within a unit cube, but requires more sample points within the unit cube.

The polyhedron extraction step selects a small number of sample points to be used in computing a given function approximation. These sample points are represented as vertices of a tetrahedron. The extraction process identifies the tetrahedron containing an arbitrarily selected point, i.e., a target evaluation point, for which an approximation is desired. The coordinates of these tetrahedra vertices and the corresponding function values at these vertices are stored in an interpolation table. Using the interpolation table, the extraction process retrieves the function values at the coordinates of the vertices of the extracted tetrahedron. The extraction process accepts an input in the form of the coordinates of a target evaluation point (r,s,t). Next, a test is performed to determine whether the target evaluation point (r,s,t) is totally enclosed within a tetrahedron. If so, the four vertices defining the tetrahedron ape retrieved. If not, it is determined whether or not the target evaluation point (r,s,t) lies on one of the faces,but is not a vertex, of a tetrahedron. If the evaluation point lies on one of the faces of a tetrahedron, then either of the adjacent tetrahedra sharing that face is retrieved. If the target evaluation point does not He on a tetrahedra face, a test determines whether or not the target evaluation point is one of the vertices of a tetrahedron. If so, then any one of the tetrahedra which share the vertex is retrieved. The extraction procedure may be applied to a domain space divided in accordance with the first and/or second embodiment of the volumetric packing technique.

The third step of the invention is a function approximation method using volumetric interpolation. The interpolation process accepts an input in the form of the sample input domain points and the corresponding function values which are associated with the extracted polyhedron. The process uses these inputs to generate an approximate value for the function at the target evaluation point. The tetrahedral volumetric interpolation process commences by subdividing the extracted tetrahedron into four sub-tetrahedra. The subdivision is implemented by drawing lines from each of the vertices of the extracted tetrahedron to the target evaluation point to form four sub-tetrahedra.

After the sub-tetrahedra are formed, the volume of a first sub-tetrahedron is calculated. The volume of the first sub-tetrahedron is determined by using the coordinates of the sub-tetrahedron vertices. Three of the sub-tetrahedron vertices are also vertices of the extracted tetrahedron. The remaining sub-tetrahedron vertex is the target evaluation point. One of the three vertices of the extracted tetrahedron is not included in the sub-tetrahedron. This vertex is termed the opposite vertex. The volume of the first sub-tetrahedron is multiplied by the value of the function at the opposite vertex. This product constitutes the partial approximation sum for the first sub-tetrahedron.

The volume for the second sub-tetrahedron is calculated, then multiplied by the function value at the opposite vertex, determined with reference to the second sub-tetrahedron. This product is the partial approximation sum for the second sub-tetrahedron. In a similar manner, the volume for the third sub-tetrahedron is calculated and multiplied by the function value at the opposite vertex, determined with reference to the third sub-tetrahedron. This product is the partial approximation sum for the third sub-tetrahedron. Likewise, the volume for the fourth sub-tetrahedron is calculated is multiplied by the function value at the opposite vertex, determined with reference to the fourth sub-tetrahedron. This product is the partial approximation sum for the fourth sub-tetrahedron.

The four partial approximation sums for the sub-tetrahedra are added together to form a non-normalized approximation sum. The non-normalized approximation sum is normalized to the volume of the extracted tetrahedron. The normalized sum constitutes the approximated value of the function at the target evaluation point.

The volumetric interpolation process set forth above uses the following formula:

$$\text{Approximation Result} = (1/(V_t)) \left( \sum_{i=1}^{4} V_i \times F_i \right),$$

where $V_t$ is the volume of the extracted tetrahedron, $V_i$ is the volume of the tetrahedron formed by replacing the coordinates of the $i^{th}$ vertex of the extracted tetrahedron with the coordinates of the target evaluation point and $F_i$ is the stored value of the function at the ith vertex.

BRIEF DESCRIPTION OF THE DRAWINGS

The various features, aspects, and advantages of the present invention will become apparent from the following more particular description thereof, presented in conjunction with the following drawings, wherein.

BRIEF DESCRIPTION OF THE TABLES

TABLE 1 sets forth exemplary tetrahedra coordinates utilized by the packing method of the present invention. TABLE 2 sets forth the addressing technique for all sample points that are a vertex of any tetrahedron within a given rectangular solid according to a preferred embodiment of the invention.

DETAILED DESCRIPTION OF THE PREFERRED EMBODIMENTS

Figure 1:
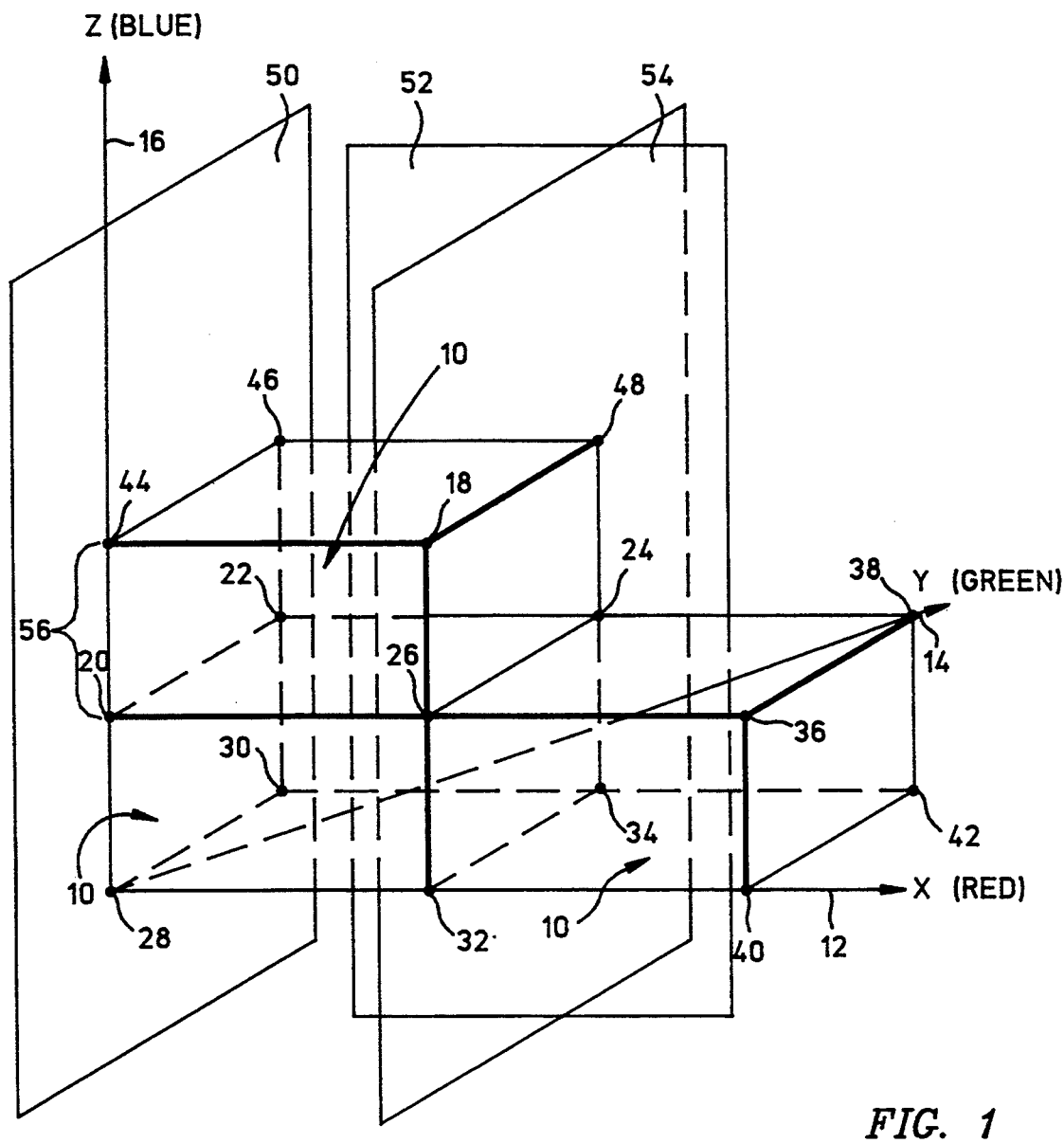
FIG. 1 is a perspective view illustrating the division of the domain of a multivariable mathematical function representing RGB color space into rectangular solids.

The present invention sets forth a technique and apparatus for subdividing a function domain into polyhedra. In the context of a function having a three-dimensional domain space, the domain is divided into a plurality of rectangular solids, as illustrated in FIG. 1. Each rectangular solid is then packed with tetrahedra and octahedra. The tetrahedra and octahedra may extend across the boundaries of adjacent rectangular solids.

With reference to FIG. 1, the rectangular solids are defined by a plurality of planes of constant value for each input dimension measured along the x axis 12, the y axis 14, and the z axis 16. For example, FIG. 1 illustrates two planes 50, 54 of constant value in the x direction and situated along the x axis 12. One plane 52 is shown with a constant value in the y direction along the y axis 14. For planes situated in the same input dimension, such as planes 50 and 54, the planes will be parallel with respect to one another. Planes representing different dimensions, such as planes 52 and 54, will be situated in mutually orthogonal configurations.

The function domain illustrated in FIG. 1 has been divided into rectangular volumes 10 of identical size over the entire function domain. However, this is not an absolute requirement. In certain situations, it may be advantageous to divide the function domain into rectangles of different sizes. For example, if the function exhibits a sharp curvature in a given region of the domain space, this region may be divided into smaller rectangles than the remainder of the function domain, thus providing greater precision in critical domain areas where the function exhibits relatively rapid changes. For the purposes of the present example, the function domain was assumed to be relatively uniform, and, consequently, the function domain was divided into rectangles of equal size.

Figure 2:
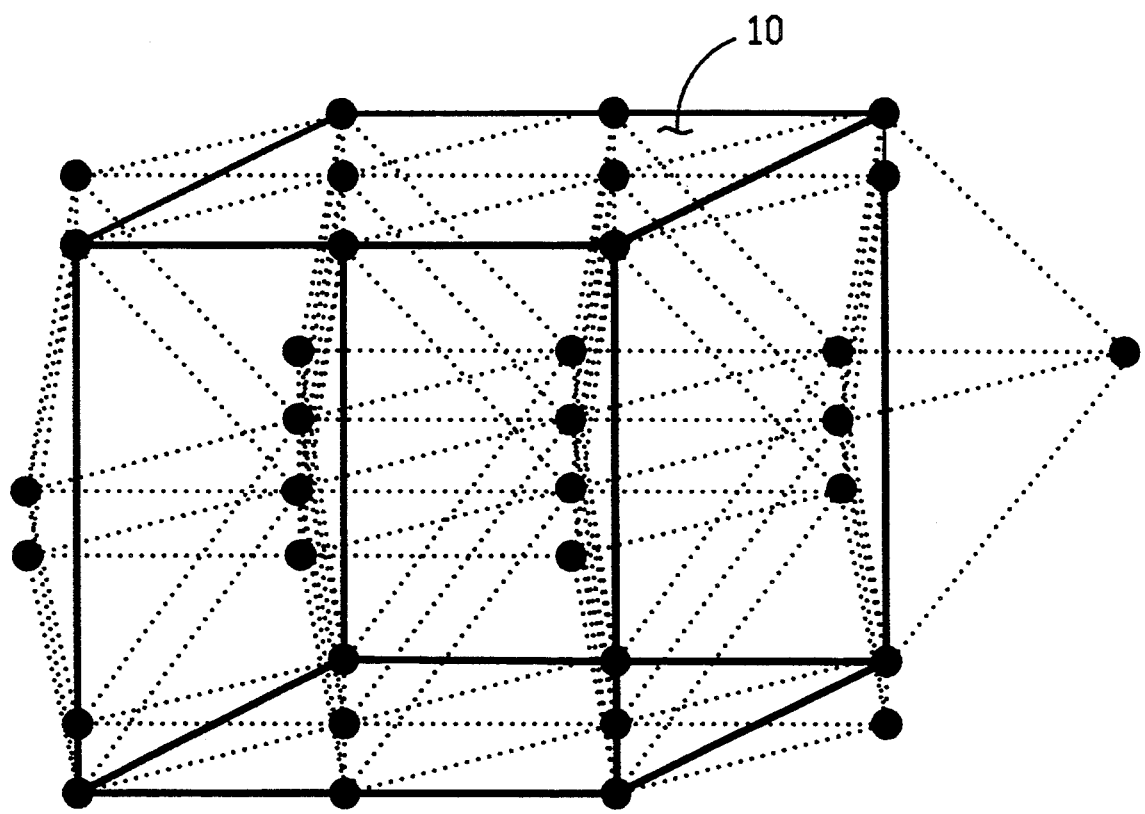
FIG. 2 is a perspective view illustrating an exemplary subdivision of a rectangular solid into 74 tetrahedral volumes.

The subdivision commences at the lowest value for the domain along each axis 12, 14, 16, and subdivides the domain along that axis into intervals 56 of equal size. The number of subdivisions in each dimension need not be the same. Each of the rectangular volumes are then subdivided into octahedra and tetrahedra which exhibit a hexagonal, close-packing structure. An example of this subdivision is shown in FIG. 2, where a rectangular volume 10 is divided into tetrahedral volumes. The packing arrangement shown in FIG. 2 is for illustrative purposes only; it is possible to pack each rectangular volume with other quantities of tetrahedra, and it is possible to adopt other geometrical arrangements of the tetrahedra within the rectangle. For example, Table I illustrates division of a unit cube into 74 tetrahedral volumes.

Figure 3A:
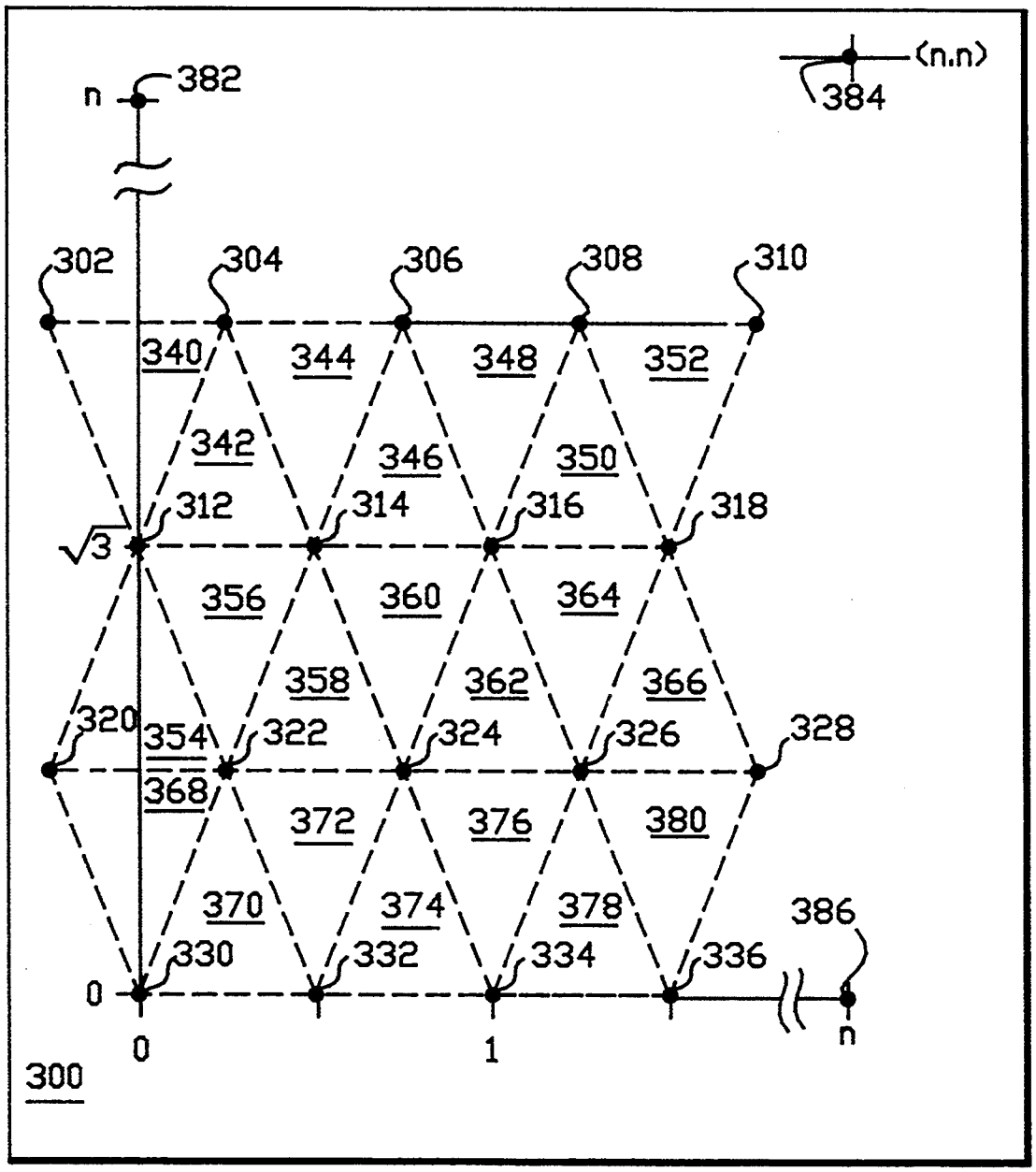
FIGS. 3A and 3B are views of an XY-plane grid for packing octahedral and tetrahedral volumes into the rectangular solids of FIG. 1.

As discussed previously in conjunction with the background of the invention, the selection of an appropriate packing technique is an important factor in determining the overall effectiveness of the function approximation method. Although packing techniques may be optimized to meet certain specific system applications, it is possible to develop advantageous packing schemes which have general applicability across a broad range of functions and applications. The present invention provides an advantageous packing method which may be implemented according to a first and/or a second alternative. A first alternative for packing octahedra and tetrahedra into the rectangular volume 10 is illustrated in FIG. 2. This volumetric packing technique is based upon the use of a planar grid of points which form layer i. Such a grid is shown in FIG. 3A and consists of points 302, 304, 306, 308, 310, 312, 314, 316, 318, 320, 322, 324, 326, 328, 330, 332, 334, and 336 interconnected to form a plurality of triangles 340, 342, 344, 346, 348, 350, 352, 354, 356, 358, 360, 362, 364, 366, 368, 370, 372, 374, 376, 378, 380, and 382. The grid is formed on the XY-plane 300 within the area bounded by the points (0,0) (reference 330), (n,0) (reference 386), (0,n) (reference 382), and (n,n) (reference 384), according to the procedure described in conjunction with FIG. 4.

Figure 3B:
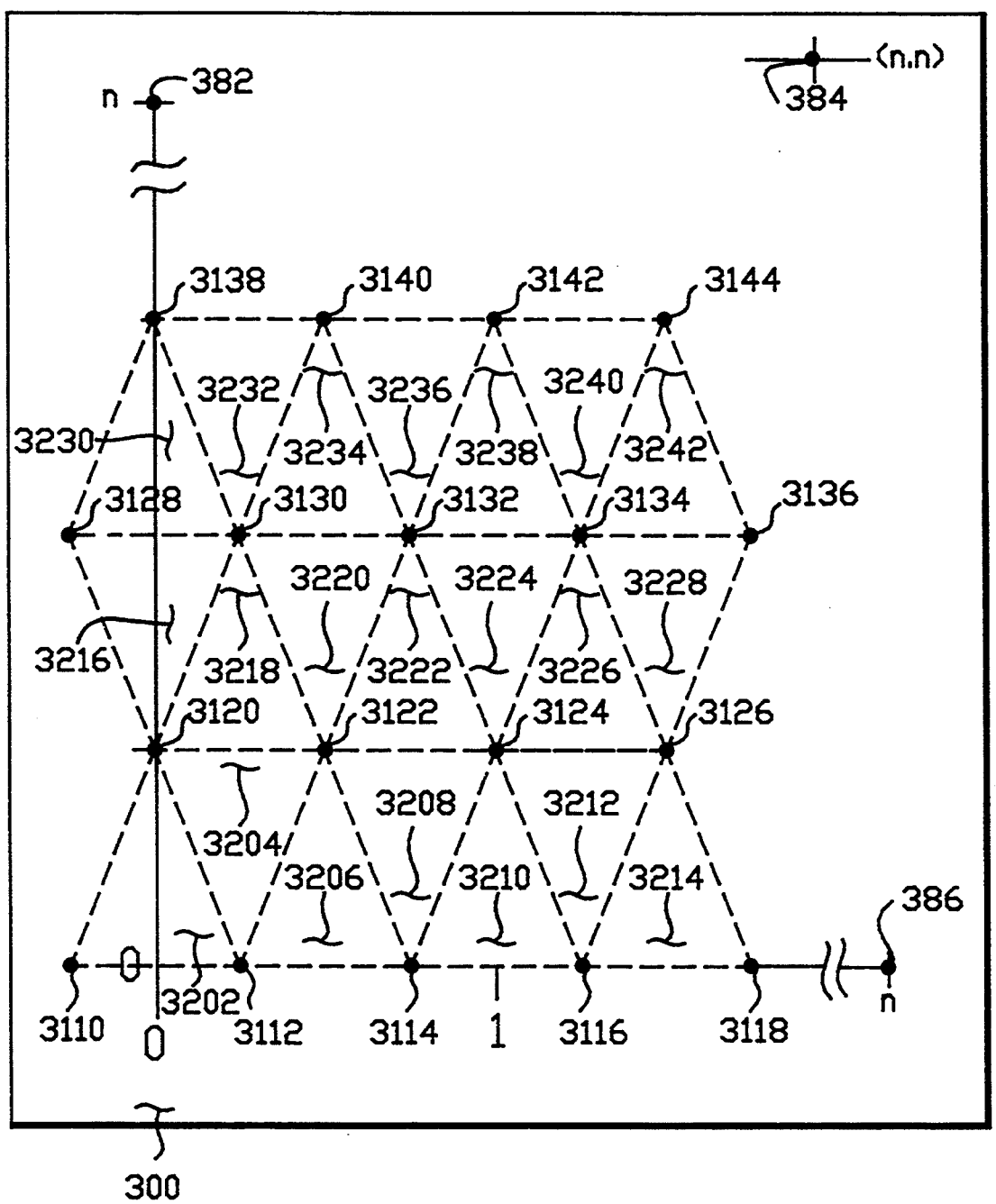
Figure 4:
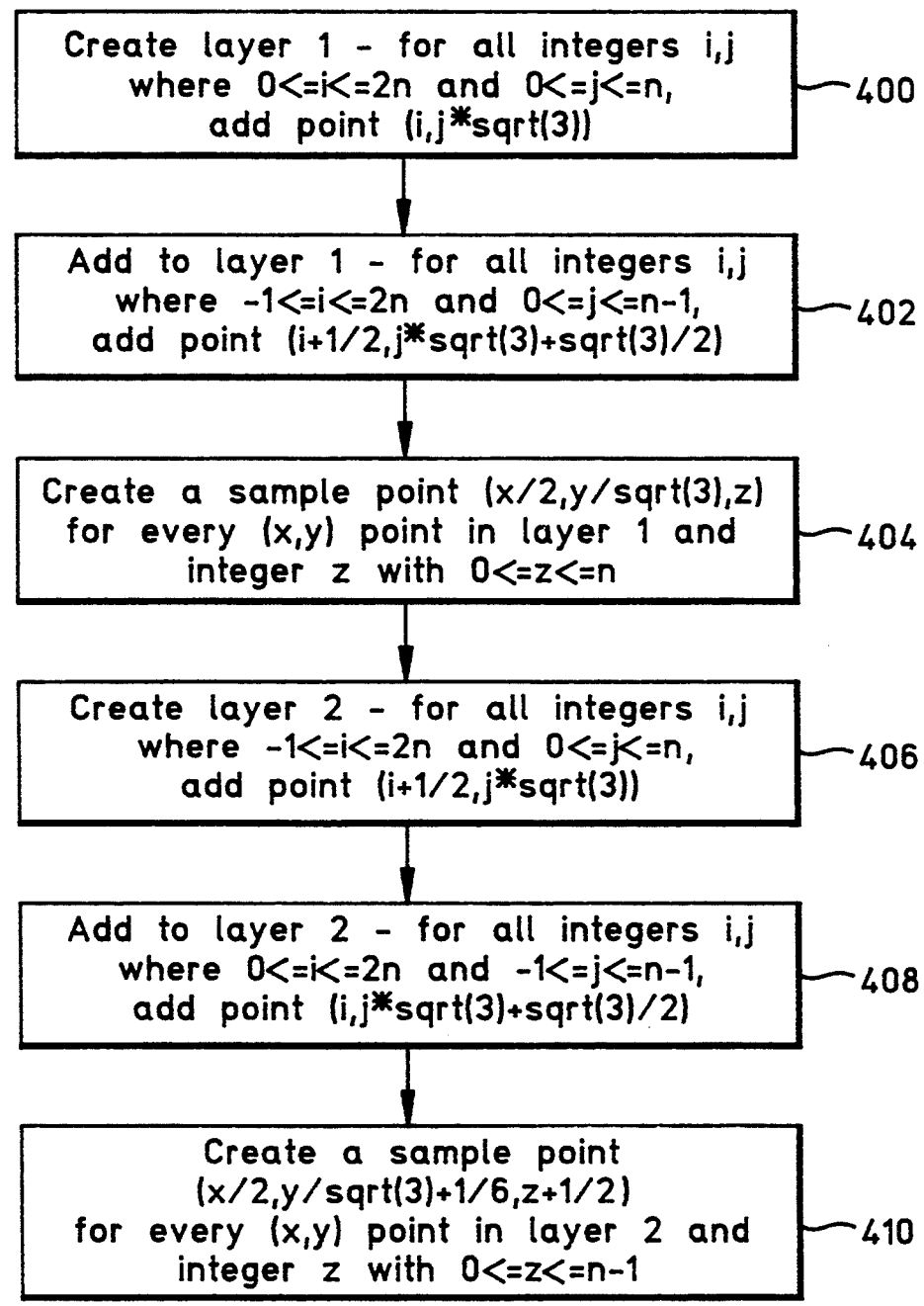
FIG. 4 is a flowchart setting forth the procedure for constructing the XY-plane grid shown in FIG. 3.

Referring now to FIG. 4, the process for alternative 1 commences at block 400, where all points with coordinates (i,j*sqrt(3)), such that i and j are integers with $0<=i=2n$ and $0<=j=n$, are added to the grid (FIG. 3A, references 330, 332, 334, 336, 312, 314, 316 and 318). Next, at block 402, all points with coordinates (i+½,j*sqrt(3)+sqrt(3)/2), such that i and j are integers with $-1<=i<=2*n$ and $0<=j<=n-1$, are added to the grid (FIG. 3A, references 320, 322, 324, 326, 328, 302, 304, 306, 308 and 310). This constructed grid is termed layer 1. Next, at block 404, a sample point (x/2,y/sqrt(3),z) in the function domain is created for each point (x,y) in layer 1 and for each integer z with $0<=z<=n$. The process continues with the construction of layer 2. At block 406, all points with coordinates (i+½,j*sqrt(3)), such that i and j are integers with $-1<=i<=2n$ and $0<=j<=n$, are added to the grid (FIG. 3B, references 3110, 3112, 3114, 3116, 3118, 3128, 3130, 3132, 3134 and 3136). Next, at block 408, all points with coordinates (i,j*sqrt(3)+sqrt(3)/2), such that i and j are integers with $0<=i<=2n$ and $0<=j<=n-1$, are added to the grid (FIG. 3B, references 3120, 3122, 3124, 3126, 3138, 3140, 3142, 3144). Finally, at block 410, a sample point (x/2,y/sqrt(3)+1/6,z+½) in the function domain is created for each point (x,y) in layer 2 and for each integer z with $0<=z<=n-1$.

Figure 5:
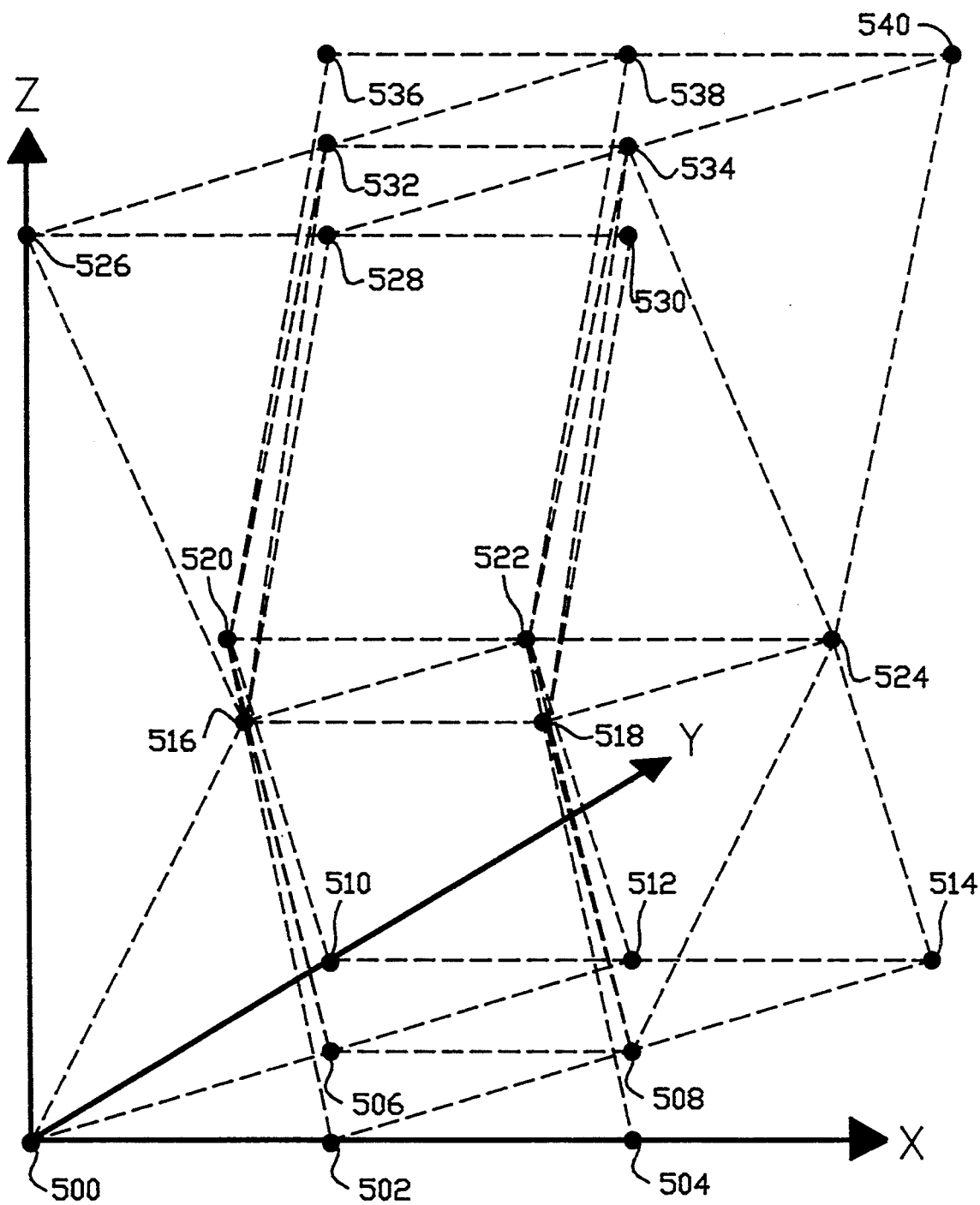
FIG. 5 is a perspective view showing the application of the procedure of FIGS. 4A and 4B to a basic unit in the XY plane to create a grid in three-dimensional function domain space along the X, Y, and Z axes.

As illustrated in FIG. 5, the volumetric packing procedure described in FIG. 4 generates a regular structure. The points that are generated within a unit cube bounded by (0,0,0) (reference 500) and (1,1,1) (reference 540) are (0,0,0), (½,0,0), (1,0,0), (¼,½,0), (¾,½,0), (0,1,0), (½,1,0), (1,1,0), (¼,1/6,½), (¾,1/6,½), (0,⅔,½), (½,⅔,½), (1,⅔,½), (0,0,1), (½,0,1), (1,0,1), (¼,½,1), (¾,½,1), (0,1,1), (½,1,1), and (1,1,1) (references 500, 502, 504, 506, 508, 510, 512, 514, 516, 518, 520, 522, 524, 526, 528, 530, 532, 534, 536, 538 and 540, respectively).

A second alternative for packing tetrahedra and octahedra into rectangular volumes is similar to the first alternative described in conjunction with FIGS. 3–5. However the second alternative creates sample points as follows. First, a sample point (x/6,y/sqrt(27),z) is created for every point (x,y) in layer 1 and integer value z with $0<=z<=n$. Next, a sample point (x/6,y/sqrt(27)+1/18,z+1/6) is created for every point (x,y) in layer 2 and integer value z with $0<=z<=n-1$. Next, a sample point (x/6,y/sqrt(27)+1/9,z+1/3) is created for every point (x,y) in layer 1 and integer value z with $0<=z\leqq=n$. Next, a sample point (x/6,y/sqrt(27)+1/6,z+½) is created for every point (x,y) in layer 2 and integer value z with $0<=z<=n-1$. Then, a sample point (x/6,y/sqrt(27)+2/9,z+⅔) is created for every point (x,y) in layer 1 and integer value z with $0<=z<=n$. Finally, a sample point (x/6,y/sqrt(27)+5/18,z+5/6) is created for every point (x,y) in layer 2 and integer value z with $0<=z<=n-1$. Although the remainder of the detailed description refers to the first alternative of the volumetric packing procedure, the techniques to be described below are equally applicable to the second alternative.

The first or second alternatives of tile volumetric packing technique may be adapted to pack more or fewer tetrahedra and octahedra into each rectangular solid than was described in the paragraphs above. The adaptation is implemented by scaling layers 1 and 2 and then offsetting the layers in the y and z directions to create regular (or substantially regular) octahedra and tetrahedra. The first and second alternatives may also be adapted to provide a broader range of packing configurations by introducing one or more reflections, scaling, or skewing in one or more directions (x, y, and/or z). For example, a reflection in the z direction may be utilized in conjunction with the first alternative of the volumetric packing technique.

The present invention sets forth an improved technique for extracting a polyhedron from the function domain space. Extraction may be defined as the process of selecting a small number of sample points to be used in computing a given function approximation. Since the sample points typically represent polyhedra vertices, extraction refers to the process of identifying the polyhedron containing the arbitrarily selected point for which an approximation is desired. The arbitrarily selected point may be called the target evaluation point. In the context of an interpolation scheme utilizing tables, the extraction process generally involves extracting the desired function values from a table. The desired function values are the function values which correspond to domain sample points at the coordinates of the vertices of the extracted polyhedron.

Figure 6:
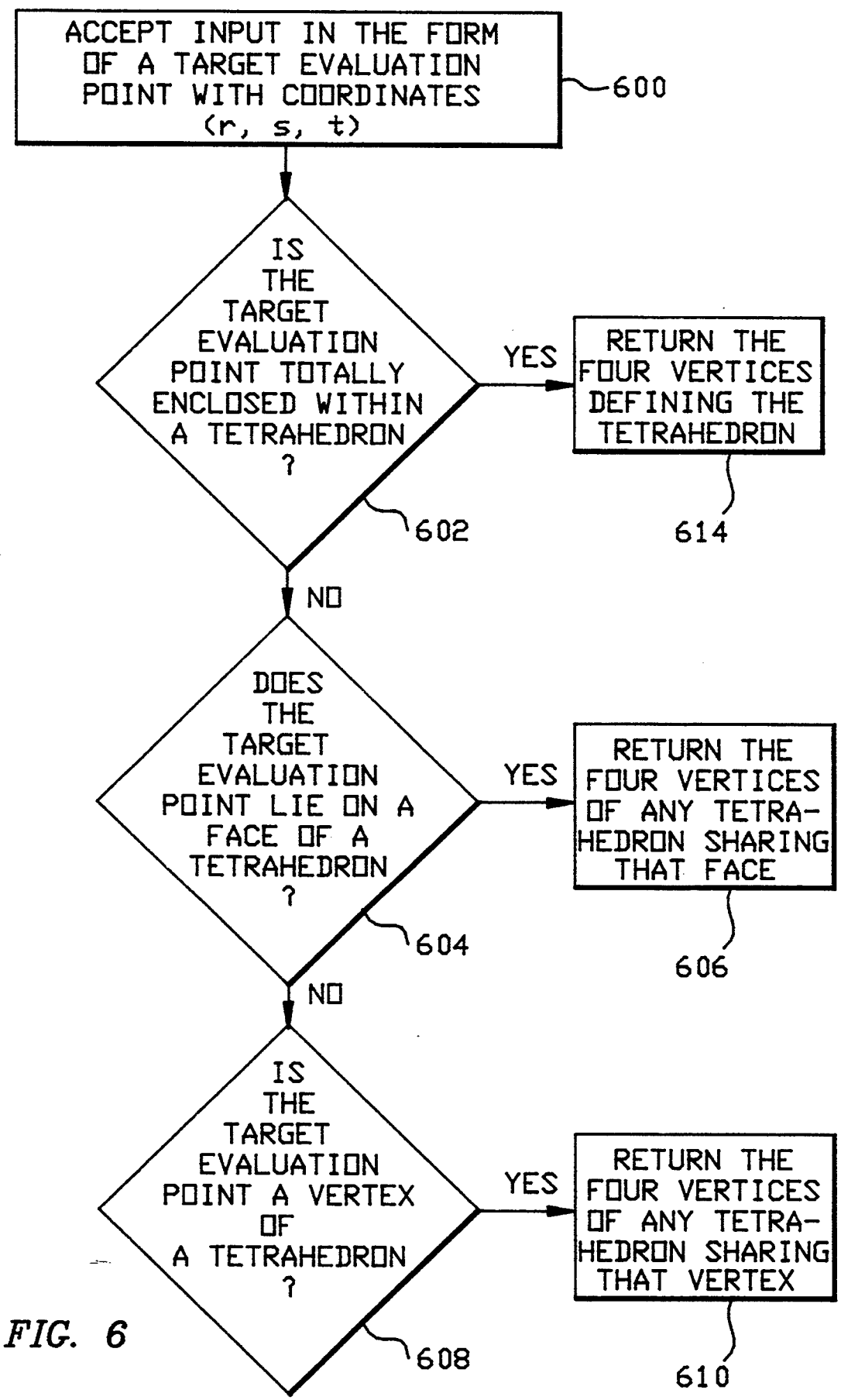
FIG. 6 is a flowchart setting forth the procedure for extracting a tetrahedron.

FIG. 6 is a flowchart setting forth the procedure for extracting a polyhedron according to a preferred embodiment of the invention. For a three-dimensional function, the extraction procedure returns the coordinates of a tetrahedron consisting of four vertices. At block 600, the procedure accepts an input in the form of the coordinates of a target evaluation point (r,s,t). Next, a test is performed to determine whether or not the target evaluation point (r,s,t) is totally enclosed within a tetrahedron (block 602). If so, the four vertices defining the tetrahedron are returned at block 614. The negative branch from block 602 leads to block 604, where a test is performed to determine whether or not the target evaluation point (r,s,t) lies on one of tile faces, but not within a vertex, of a tetrahedron. If the evaluation point lies on one of the faces of a tetrahedron, then any one of the adjacent tetrahedra sharing that face is returned (block 606). The return of any of these tetrahedra is allowed because the interpolation procedure should provide continuous approximation results across the faces of adjacent tetrahedra.

If the negative branch from block 604 is followed, the procedure progresses to block 608, where a test determines whether or not the evaluation point is one of the vertices of a tetrahedron. If so, then any one of the tetrahedra which share the vertex is returned at block 610. The return of any one of the tetrahedra is allowed because the interpolation procedure should provide continuous results at the vertex where two or more tetrahedra meet.

The procedure described in conjunction with FIG. 6 may be applied to a domain space divided in accordance with the first and/or second alternative of the volumetric packing technique as set forth in FIGS. 3–5. If either the first alternative or second alternative is chosen, the coordinates of the tetrahedra in the function domain may be calculated for a unit cube bounded by (0,0,0) and (1,1,1). It is not necessary to calculate the tetrahedra coordinates for the remainder of the function domain situated outside of the unit cube, because the geometrical configuration of the tetrahedra within the unit cube are repeated in all other 1×1×1 unit cubes in the function domain. The volumetric packing technique of the present invention results in some tetrahedra with vertices residing in two adjacent cubes. Vertices physically residing in an adjacent cube are used to define the tetrahedra within a given subcube, but the function values at these adjacent-cube vertices need only be stored once. The tetrahedra vertices for a unit cube for the first alternative are set forth in Table 1.

Figure 7:
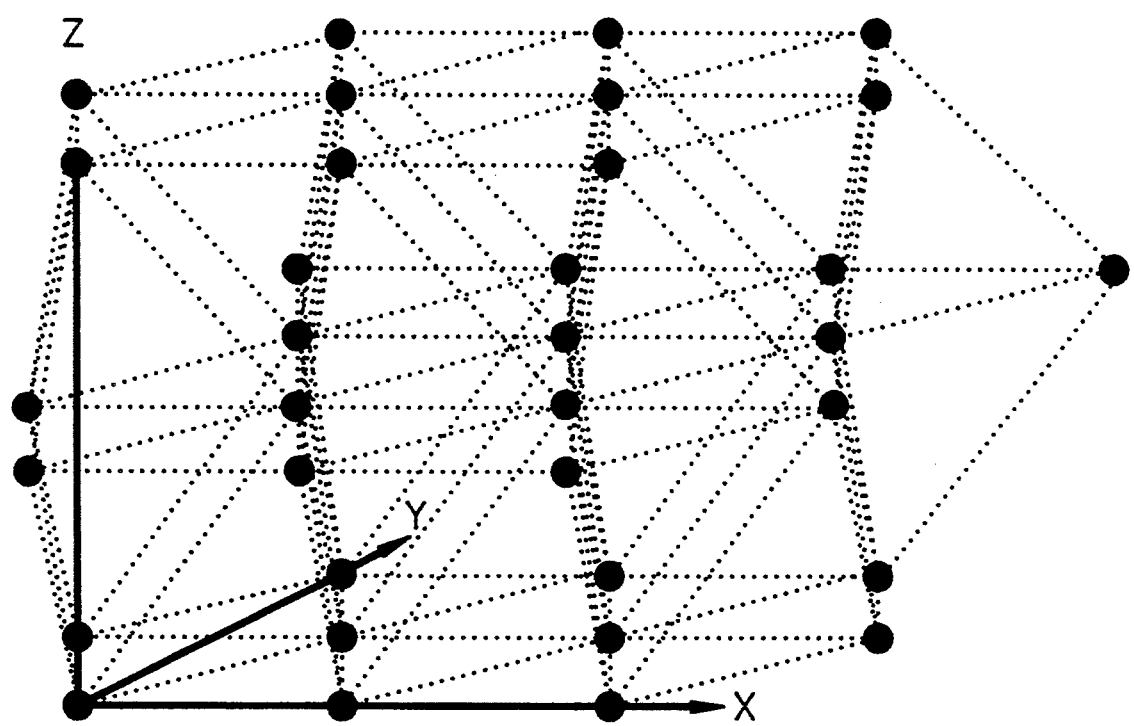
FIG. 7 is a perspective view showing an exemplary division of a function domain into tetrahedra using the method of FIG. 6.

FIG. 7 is a perspective view showing an exemplary division of a function domain into tetrahedra using the method of FIG. 6. The subdivision of FIG. 7 was produced using the first alternative of the volumetric packing technique in order to minimize the distortion of the domain space from regular tetrahedra. In this example, the domain space may be conceptualized as being packed with a plurality of tetrahedra and octahedra, such that each octahedron contains four tetrahedra. Other methods for the subdivision could also be used, such as the second embodiment of the volumetric packing technique.

Figure 8A:
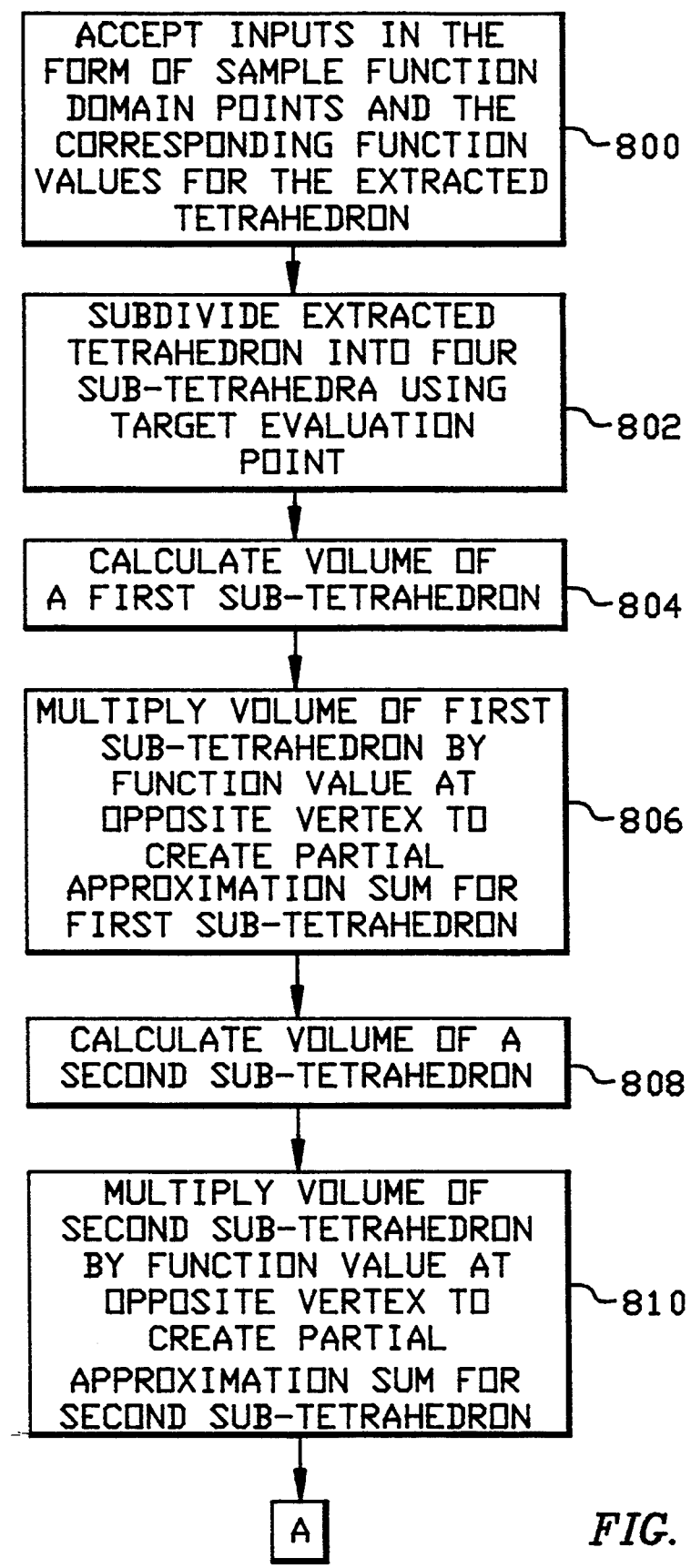
FIGS. 8A and 8B are a flowchart setting forth the procedure for function approximation according to the invention.
Figure 8B:
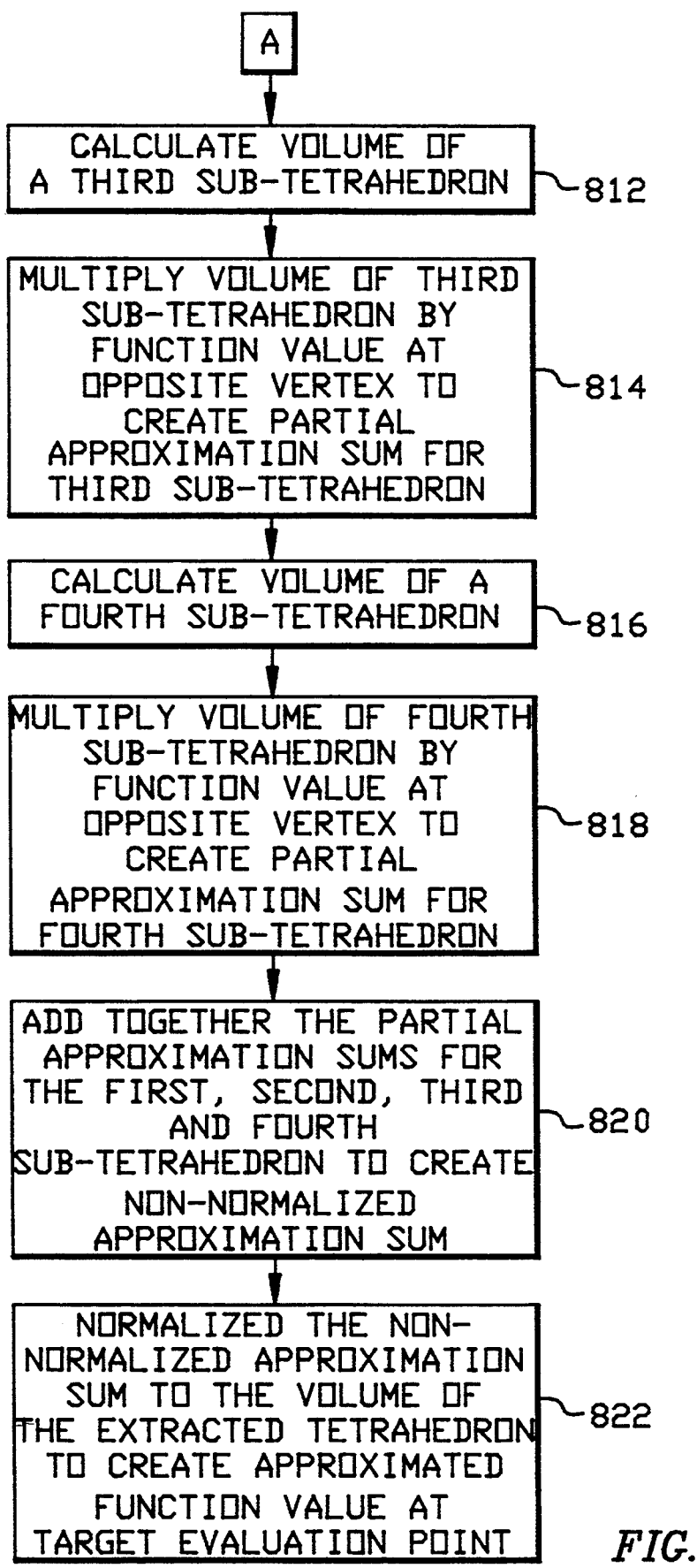

After the processes of domain subdivision and polyhedron extraction have been implemented, the function approximation method of the present invention conducts a mathematical interpolation process, as described in the flowchart of FIGS. 8A and 8B. At block 800, the interpolation process accepts an input in the form of the sample domain points and the corresponding function values which are associated with the extracted polyhedron. The process uses these inputs to generate an approximate value for the function at the target evaluation point. As described above, these domain points and function values are generally organized in the form of one or more tables. The tables are stored in a memory device such as random access memory (RAM).

The process of FIGS. 8A and 8B employs an interpolation technique known as tetrahedral volumetric interpolation. This technique is often selected in preference to other methods of approximating a function because it requires fewer arithmetic operations to compute an approximation. The reduced number of steps required to execute tetrahedral interpolation has important practical consequences, in that less hardware is required, and the computational steps may be implemented faster and more efficiently.

Figure 9:
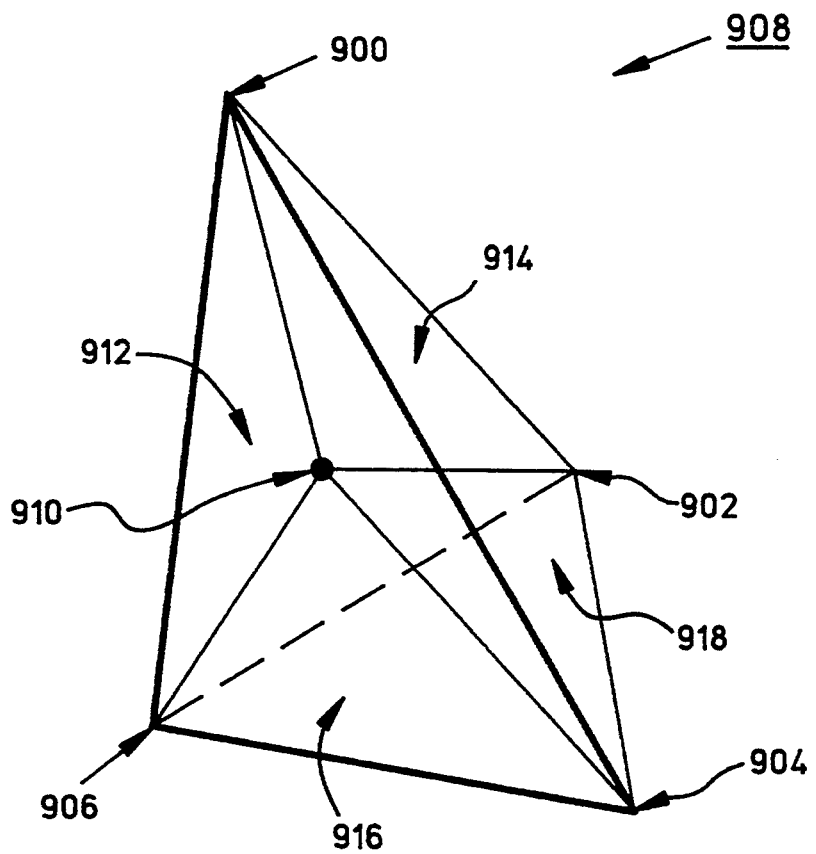
FIG. 9 is a perspective view illustrating the application of the procedure set forth in FIGS. 8A and 8B to create four sub-tetrahedral volumes in function domain space from the tetrahedral volume which includes the target evaluation point.

In response to the input received at block 800, the tetrahedral volumetric interpolation process takes the extracted tetrahedron and subdivides it into four sub-tetrahedra (block 802). With reference to FIG. 9, the subdivision is implemented by drawing lines from each of the vertices 900, 902, 904, 906 of the extracted tetrahedron 908 to the target evaluation point 910. In this manner, four sub-tetrahedra 912, 914, 916, and 918 are formed.

After the sub-tetrahedra are formed in block 802, the volume of a first sub-tetrahedron is calculated at block 804. The volume of the first sub-tetrahedron 912 (FIG. 9) is determined by using the coordinates of the sub-tetrahedron 912 vertices (references 900, 904, 906 and 910). Three of the sub-tetrahedron 912 vertices (references 900, 904, and 906) are also vertices of the extracted tetrahedron 908. The remaining sub-tetrahedron 912 vertex is the target evaluation point 910. Note that one of the three vertices of the extracted tetrahedron 908 is not included in the sub-tetrahedron 912. This vertex (reference 902) is termed the opposite vertex. In block 806 (FIG. 8A), the volume of the first sub-tetrahedron 912 (FIG. 9) is multiplied by the value of the function at the opposite vertex. This product constitutes the partial approximation sum for the first sub-tetrahedron 912.

The volume for the second sub-tetrahedron 914 is calculated at block 808 (FIG. 8A). At block 810, the calculated volume is multiplied by the function value at the opposite vertex, determined with reference to the second sub-tetrahedron 914 (FIG. 9). This product is the partial approximation sum for the second sub-tetrahedron 914. In a similar manner, the volume for the third sub-tetrahedron 916 is calculated at block 812 (FIG. 8B). At block 814, the calculated volume is multiplied by the function value at the opposite vertex, determined with reference to the third sub-tetrahedron 916. This product is the partial approximation sum for the third sub-tetrahedron 916. Likewise, the volume for the fourth sub-tetrahedron 918 is calculated at block 816 (FIG. 8B ). At block 818, the calculated volume is multiplied by the function value at the opposite vertex, determined with reference to the fourth sub-tetrahedron 918. This product is the partial approximation sum for the fourth sub-tetrahedron 918.

The partial approximation sums for the sub-tetrahedra 912, 914, 916, 918 as calculated in blocks 806, 810, 814, and 818 (FIGS. 8A and 8B), respectively, are added together at block 820 to form a non-normalized approximation sum. At block 822, the non-normalized approximation sum is normalized to the volume of the extracted tetrahedron 908. The normalized sum determined in block 822 constitutes the approximated value of the function at the target evaluation point 910.

The steps implemented in blocks 804–822 may be summarized in the form of the following formula:

$$\text{Approximation Result} = (1/V_t)\left(\sum_{i=1}^{n} V_i \times F_i\right) \quad (1)$$

where $V_t$ is the volume of the extracted tetrahedron 908, $V_i$ is the volume of the tetrahedron formed by replacing the coordinates of the ith vertex of the extracted tetrahedron 908 with the coordinates of the target evaluation point 910, and $F_i$ is the stored value of the function at the ith vertex, and n is the number of subtetrahedra into which the tetrahedron 908 is divided (four in the preferred embodiment).

The preferred embodiment of the invention operates in the context of a three-dimensional function, with each function component represented by an 8-bit value. The rectangular solids of the function domain are constructed such that there are 16 solids along each component of the domain, i.e., the x axis, the y axis, and the z axis, for a total of 17 planes along each axis. It is assumed that the function is continuous even outside of the domain of interest, and that the function can be evaluated for the sample domain input points as described above in conjunction with packing techniques. These assumptions enable the utilization of a uniform addressing system. If these assumptions are not valid, then the intervals at the domain boundaries must be treated as special cases.

Figure 10:
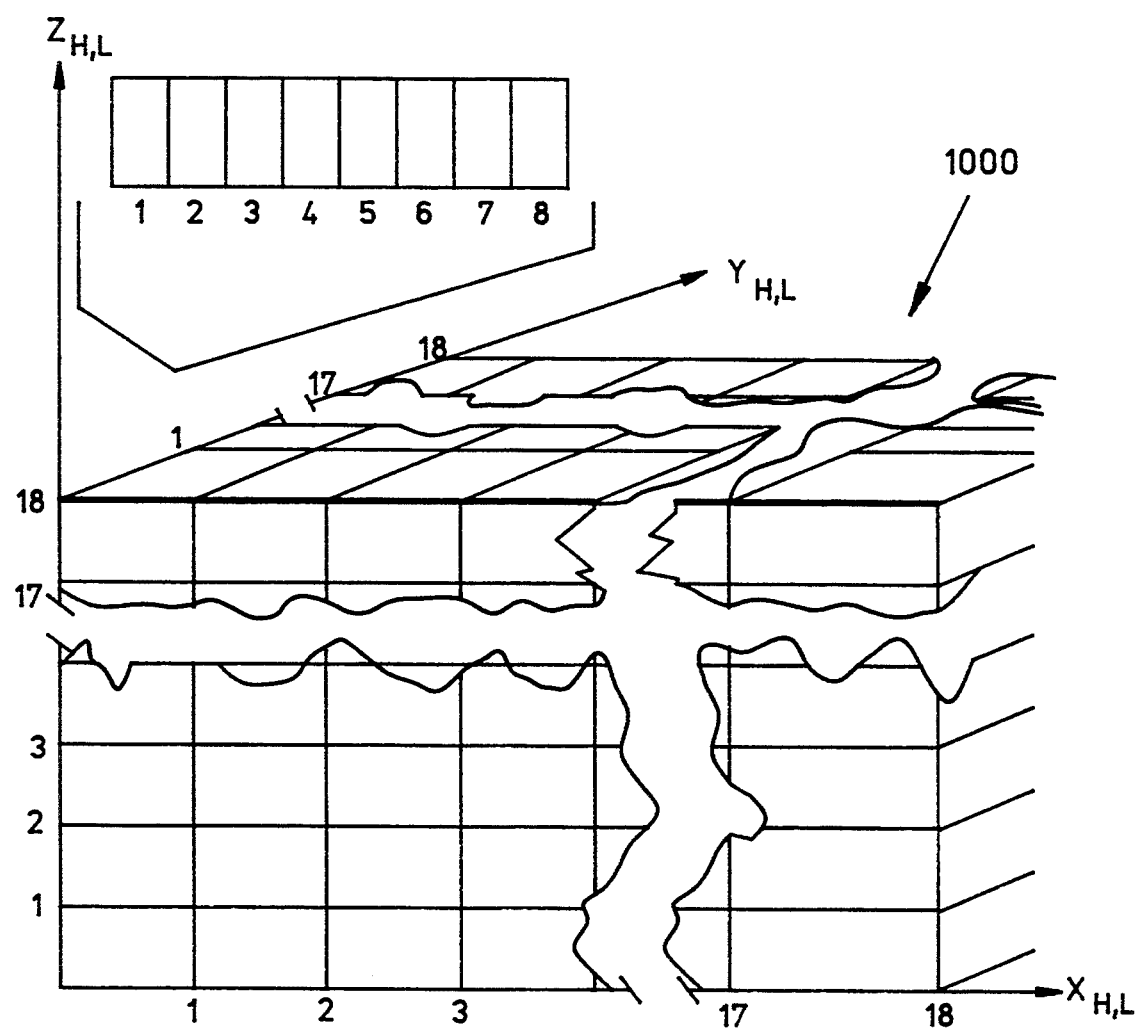
FIG. 10 illustrates the data structure for the F array utilized by a preferred embodiment of the present invention.

The function values at the sample domain points are saved in a four-dimensional array, F, with 46,656 entries (18×18×18×8). The data structure for the F array 1000 is shown in FIG. 10. The F array is stored in a memory device such as random access memory (RAM). The function values are indexed in memory as follows. Let (x,y,z) be the target evaluation point with x=16 $x_h+x_1$, y=16 $y_h+y_1$, and z=16 $z_h+z_1$, where $x_h$ represents the four high order bits of x, $x_1$ represents the four low order bits of x, and similarly for y and z. Then $F(x_h+1, y_h+1, z_h+1, *)$ is used as the base address for accessing the sample values enclosed by the rectangular solid with lower left corner (16 $x_h$, 16 $y_h$, 16 $z_h$), where each of the first three indices of F range over the interval of 0 to 17. The fourth index ranging over the interval 0 to 7 denotes a sample value enclosed in or on a surface of the rectangular solid and occupying a vertex location in the hexagonal, close-packing structure. The required addressing for all sample points that are vertices of any tetrahedron with a part of its volume within a rectangular solid is set forth in TABLE 2.

Figure 11:
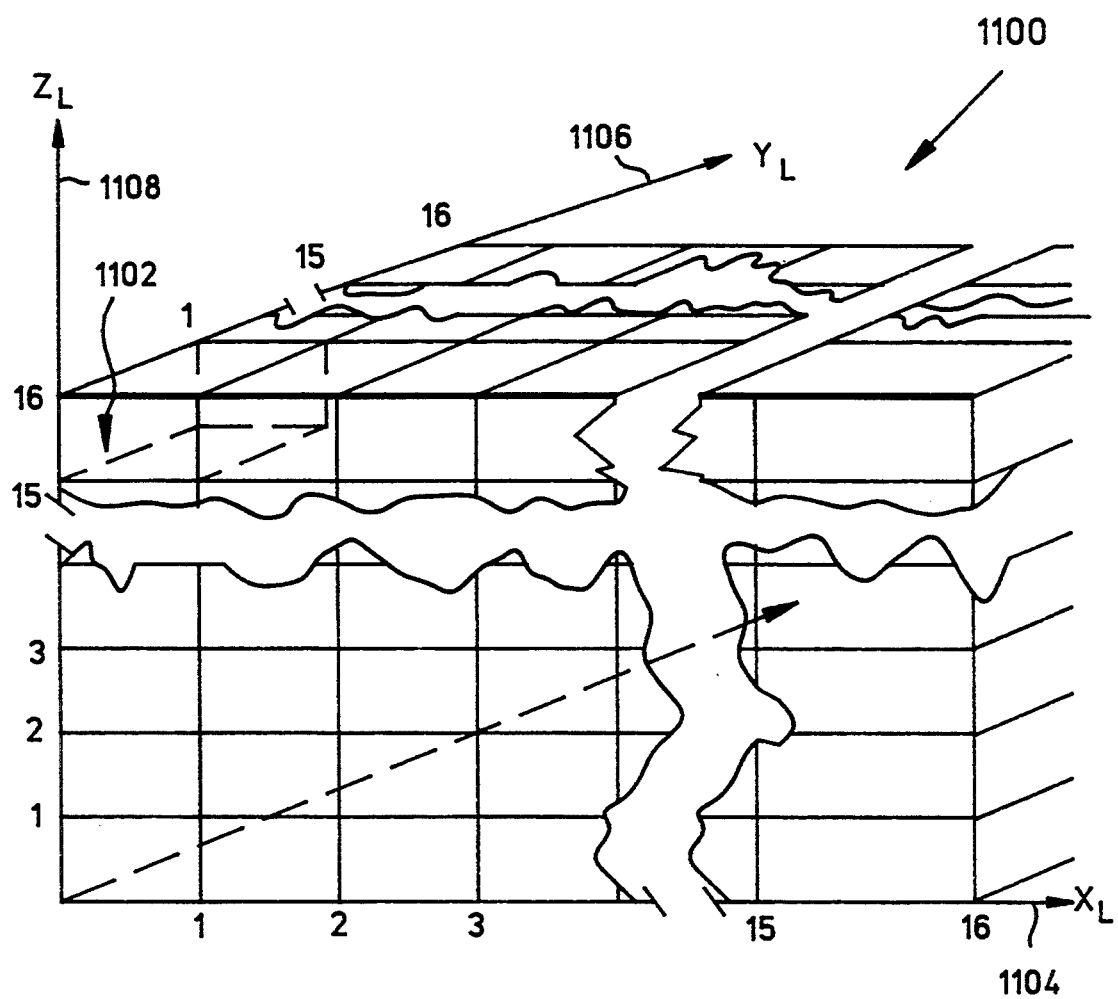
FIG. 11 illustrates the data structure for the WandV array utilized by a preferred embodiment of the invention.

In addition to the F array 1000, the invention employs a second array termed the Weights and Vertices (WandV) array. The data structure for the WandV array is shown in FIG. 11. The WandV array 1100 is a table of 4096 entries representing a structure for each element of the F array. The $X_L$ axis 1104 represents the color red, the $Y_L$ axis 1106 represents the color green, and the $Z_L$ axis 1108 represents the color blue. The WandV array 1100 is addressed using WandV $(x_1,y_1,z_1)$, where each of the three indices of WandV is in the range of 0 to 15. The WandV data structure contains the information for the point with offset $(x_1,y_1, z_1)$ within a unit rectangular solid bounded by (0,0,0) and (1,1,1). All points with this offset share the same properties. In this manner, the array need only be computed once, but may subsequently be used often as required to implement many approximations.

The data structure for each element 1102 of the WandV array 1100 contains the following eight items:

(1) the increment $O_1$, which is added to the value $(x_h,y_h,z_h,0)$ to obtain the index within F of the first sample point, a vertex of a tetrahedron which contains the input point (x,y,z). This increment is in the form of a mathematical construct known as a four tuple.

(2) the increment $O_2$, which is added to the value $(x_h,y_h,z_h,0)$ to obtain the index within F of the second sample point, a vertex of the tetrahedron. This increment is in the form of a four tuple.

(3) the increment $O_3$, which is added to the value $(x_h,y_h,z_h,0)$ to obtain the index within F of the third sample point, a vertex of the tetrahedron. This increment is in the form of a four tuple.

(4) the increment $O_4$, which is added to the value $(x_h,y_h,z_h,0)$ to obtain the index within F of the fourth sample point, a vertex of the tetrahedron. This increment is in the form of a four tuple.

(5) the weight $W_1$ which is multiplied by the value $F((x_h,y_h,z_h,0)+O_1)$ to obtain a portion of the final approximation. This value is equal to the volume of the tetrahedron formed using the target offset and the three sample points remaining after excluding the point indexed by $O_1$, divided by the volume of the extracted tetrahedron.

(6) the weight $W_2$ which is multiplied by the value $F((x_h,y_h,z_h,0)+O_2)$ to obtain a portion of the final approximation. This value is equal to the volume of the tetrahedron formed using the target offset and the three sample points remaining after excluding the point indexed by $O_2$, divided by the volume of the extracted tetrahedron.

(7) the weight $W_3$ which is multiplied by the value $F((x_h,y_h,z_h,0)+O_3)$ to obtain a portion of the final approximation. This value is equal to the volume of the tetrahedron formed using the target offset and the three sample points remaining after excluding the point by $O_3$, divided by the volume of the extracted tetrahedron.

(8) the weight $W_4$ which is multiplied by the value $F((x_h,y_h,z_h,0)+O_4)$ to obtain a portion of the final approximation. This value is equal to the volume of the tetrahedron formed using the target offset and the three sample points remaining after excluding the point by $O_4$, divided by the volume of the extracted tetrahedron.

The technique of the present invention calculates the final approximation F (x,y,z) from the WandV array 1100 and the F array 1000 (FIG. 10) as follows.

$$F(x,y,z) = \text{Wand}V(x_l,y_l,z_l) \cdot W_1 * F((x_h,y_h,z_h,0) + \quad (2)$$

$$\text{Wand}V(x_l,y_l,z_l) \cdot O_1) + \text{Wand}V(x_l,y_l,z_l) \cdot W_2 * F((x_h,y_h,z_h,0) +$$

$$\text{Wand}V(x_l,y_l,z_l) \cdot O_2) + \text{Wand}V(x_l,y_l,z_l) \cdot W_3 * F((x_h,y_h,z_h,0) +$$

$$\text{Wand}V(x_l,y_l,z_l) \cdot O_3) + \text{Wand}V(x_l,y_l,z_l) \cdot W_4 * F((x_h,y_h,z_h,0) +$$

$$\text{Wand}V(x_l,y_l,z_l) \cdot O_4).$$

Figure 12:
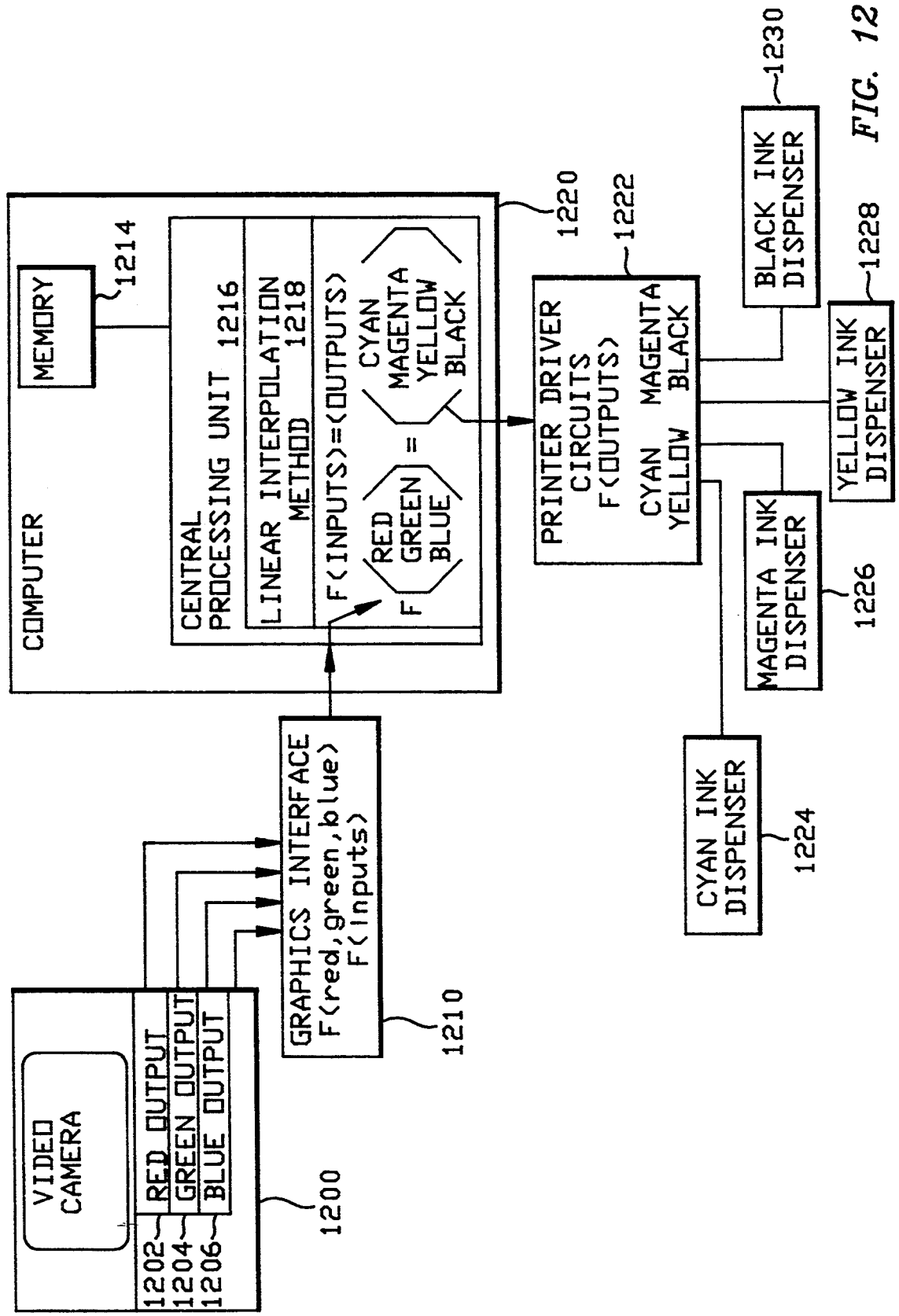
FIG. 12 is a block diagram illustrating the operational hardware environment of a preferred embodiment of the present invention.

The calculations and data manipulations necessary to solve the above formula are implemented by the system set forth in FIG. 12. FIG. 12 is a block diagram illustrating the overall operational environment of a preferred embodiment of the present invention. The volumetric interpolation method 1218 of the present invention is executed by a computer 1220 which includes a central processing unit 1216 and possibly other internal or external devices. Computer 1220 may be, for example, a simple desktop personal computer,or a large, complex mainframe computer. The central processing unit 1216 is equipped to execute the instructions necessary to implement the linear interpolation method of the invention.

The computer 1220 is coupled to a graphics interface 1210 which in the illustrated example interfaces with a video camera 1200. The video camera 1200 provides a red output 1202, a green output 1204 and a blue output 1206. The outputs are connected to the graphics interface 1210, which converts the outputs into a multivariable mathematical function having input variables of red, green and blue. The mathematical function is fed to the central processing unit 1216, where the linear interpolation method 1218 of the present invention is applied to the function. The output of the linear interpolation method 1218 in the present example is a mathematical function having outputs representing quantities of cyan, magenta, yellow and black. These outputs are fed to printer driver circuits 1222. These circuits control the amount of ink dispensed by cyan, magenta, yellow, and black ink dispensers 1224, 1226, 1228, and 1230, respectively.

FIG. 12 shows the invention as being employed in the context of a video camera 1200 and ink dispensers 1224, 1226, 1228, and 1230 for illustrative purposes and is not intended to limit application of this invention. For example, a photoluminescent video display screen could be used in place of the video camera 1200. Furthermore, the invention may be employed in contexts other than color image processing, wherever it is desired to approximate the value of a multivariable function.

The system of FIG. 12 initializes a first memory by generating and storing values of the function being evaluated. These values are generated by selecting one of the hexagonal close packing alternatives described above and outputting sample domain (RGB) points which correspond to the tetrahedra vertices for the packing structure. Function value points are generated in response to the sample domain points and are stored in a first memory at address locations described above with respect to FIG. 10. A second memory is initialized with the weights and vertices array described above in connection with FIG. 11.

Figure 13:
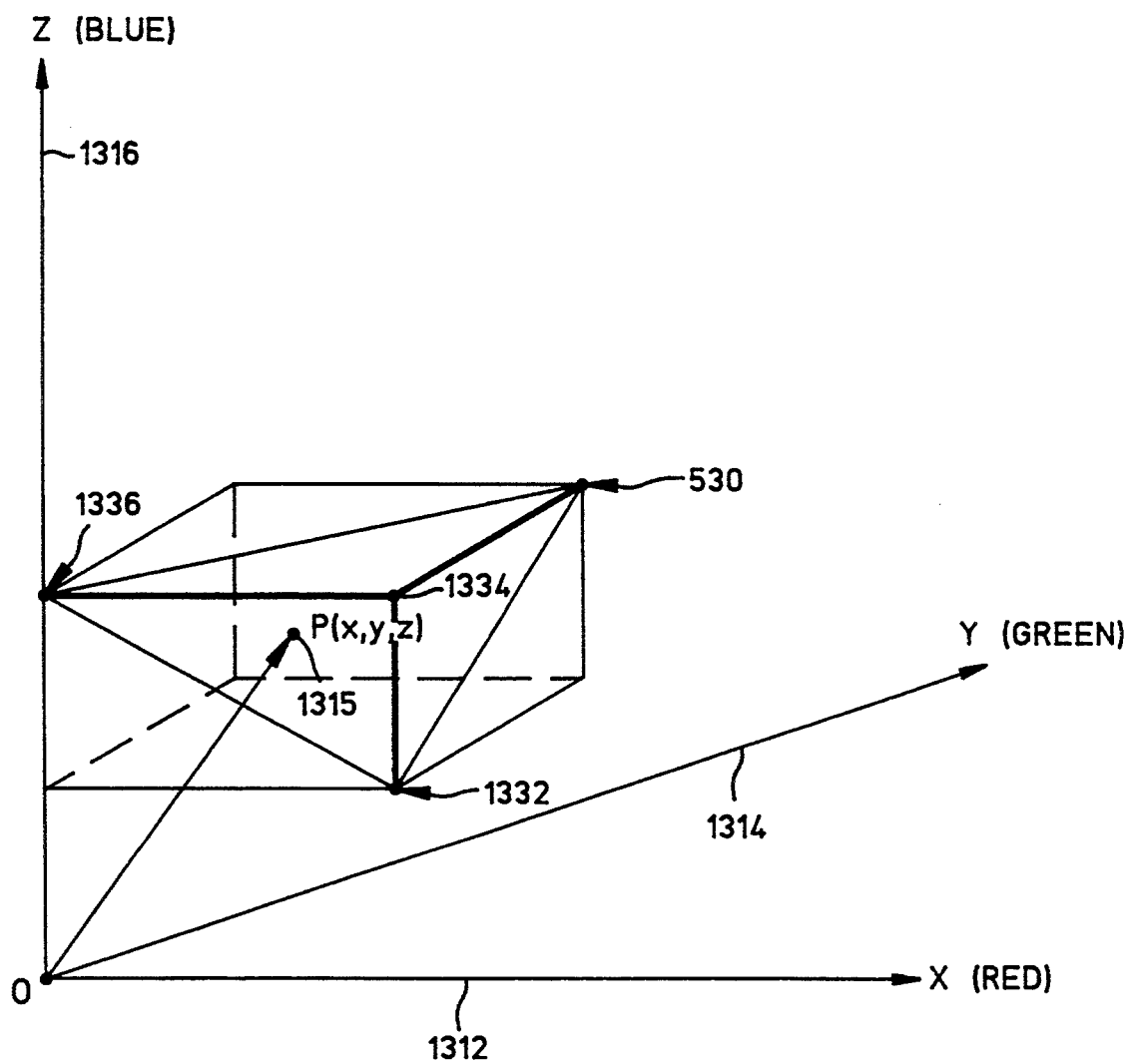
FIG. 13 is perspective view illustrating a point p which, in the environment of a color image processing system, has been selected from the domain of a function F in three-dimensional red-green-blue color space.

FIG. 13 is a three-dimensional graph illustrating a point p 1315 which has been arbitrarily selected from the domain of a function f. The x axis 1312 represents the magnitude of the color red, the y axis 1314 represents the magnitude of the color green, and the z axis 1316 represents the magnitude of the color blue. Allowable values for x, y, and z are in the range of 0 to 100, which defines the domain of the function. Although 8-bit values are frequently employed to represent color,the function domain is simplified in this example for purposes of illustration. The point p 1315 represents the color of one picture element (pixel) within a given video image specified in additive primary color form.

In the present example, point p 1315 represents a pixel of a color image received by a video camera. Assume that the video camera was aimed at the ocean, resulting in a point p 1315 at a location of x=10, y=50, and z=80, corresponding to a color in the range of cyan to blue. 1t is desired to convert the video image into a form suitable for newspaper print. The additive primary color representation of the pixel must be converted into a form representing subtractive primary colors. The conversion process may be expressed as a mathematical function with input variables of red, green, and blue, and output values of cyan, magenta and yellow.

Since the mathematical function for color conversion is relatively complex, it does not readily lend itself to analytical specification. 1t would be much more efficient to sample the value of the function at representative points throughout the function domain, and to tabulate these values for future reference. Accordingly, the domain of the function is divided using one of the packing techniques described above, and sample values for the function are taken at the vertices of each tetrahedron. Then, if it is desired to know the value of the function at an arbitrarily selected point p 1315 within the function domain, the value of the function can be interpolated by referring to the known function values at the nearest sample points. This is accomplished by using the extraction process described above to identify the tetrahedron containing the arbitrarily selected point p 1315, and the applying the volumetric interpolation process to the point p 1315 and the extracted tetrahedron to generate a function approximation.

Point p 1315 at the coordinates (10, 50, 80) lies within the tetrahedron having vertices 1330, 1332, 1334, and 1336. The relationship between the additive and subtractive primary colors has been characterized at each of the tetrahedron vertices 1330, 1332, 1334, 1336. For example, assume that vertex 1330 has coordinates of (12, 56, 84) representing respective quantities of red, green, and blue. During the function sampling process,it was determined that these quantities of red, green, and blue correspond to a magenta value of 32, a yellow value of 12, and a cyan value of 84. Similar samples were taken at vertices 1332, 1334, and 1336. The known relationship between function input (red, green, blue) and output (magenta, yellow, cyan) at these vertices 1330, 1332, 1334, 1336 is stored in a table within a memory device such as random access memory. These stored values are then subsequently utilized by the above-described volumetric interpolation procedure to approximate the relationship between function input and output at points where the exact relationship between function input and output is not known.

In the context of FIG. 13, it would be especially advantageous to utilize the packing, extraction, and interpolation processes of the invention as described above. In many state of the art color image processing systems, factors frequently come into play which are not well suited to analytical specification. Accordingly, it is often difficult or impossible to express these factors in terms of a mathematical function. However, the inputs and outputs of these systems are generally easy to observe and to characterize. Volumetric interpolation can be used to empirically ascertain the relationship between the system inputs and the system outputs, where it would otherwise be extremely difficult, due to the number and the nature of the variables involved. Considering present state-of-the-art color image processing systems, the relative ease or difficulty by which the function may be approximated oftentimes determines the overall efficiency of the color imaging process. Therefore, it is highly desirable to develop fast, effective methods of linear interpolation.

With reference to FIG. 13, the interpolation step implements equation (1) as follows. A sample tetrahedron containing the point p is obtained. Its volume ($V_t$) is known. The sample tetrahedron is then subdivided into four sub-tetrahedra. In FIG. 13, the sample tetrahedron has vertices 1330, 1332, 1334 and 1336 and volume $V_t$. The four subtetrahedra and their associated volumes are:

1330, 1332, 1334, p=$V_1$
1330, 1332, 1336, p=$V_2$
1330, 1336, 1334, p=$V_3$
1336, 1332, 1334, p=$V_4$

Each of the four ratios ($V_1/V_t$), ($V_2/V_t$), ($V_3/V_t$) and ($V_4/V_t$) is multiplied by a respective function value which corresponds to the vertex sample point omitted from the respective sub-tetrahedron.

Thus, $$\text{Result} = F_{1336}*(V_1/V_t) + F_{1334}*(V_2/V_t) + F_{1332}*(V_3/V_t) + F_{1330}*(V_4/V_t)$$

Using the memory structures of FIGS. 10 and 11, the result is obtained by obtaining the four function values from the first memory and multiplying each by the respective weight ($V_i/V_t$) obtained from the second memory. Also obtained from the second memory is the set of offsets ($O_i$) which are added to the $x_h$, $y_h$, $z_h$ values to obtain the indexes to (address of) the four function values.

Figure 14:
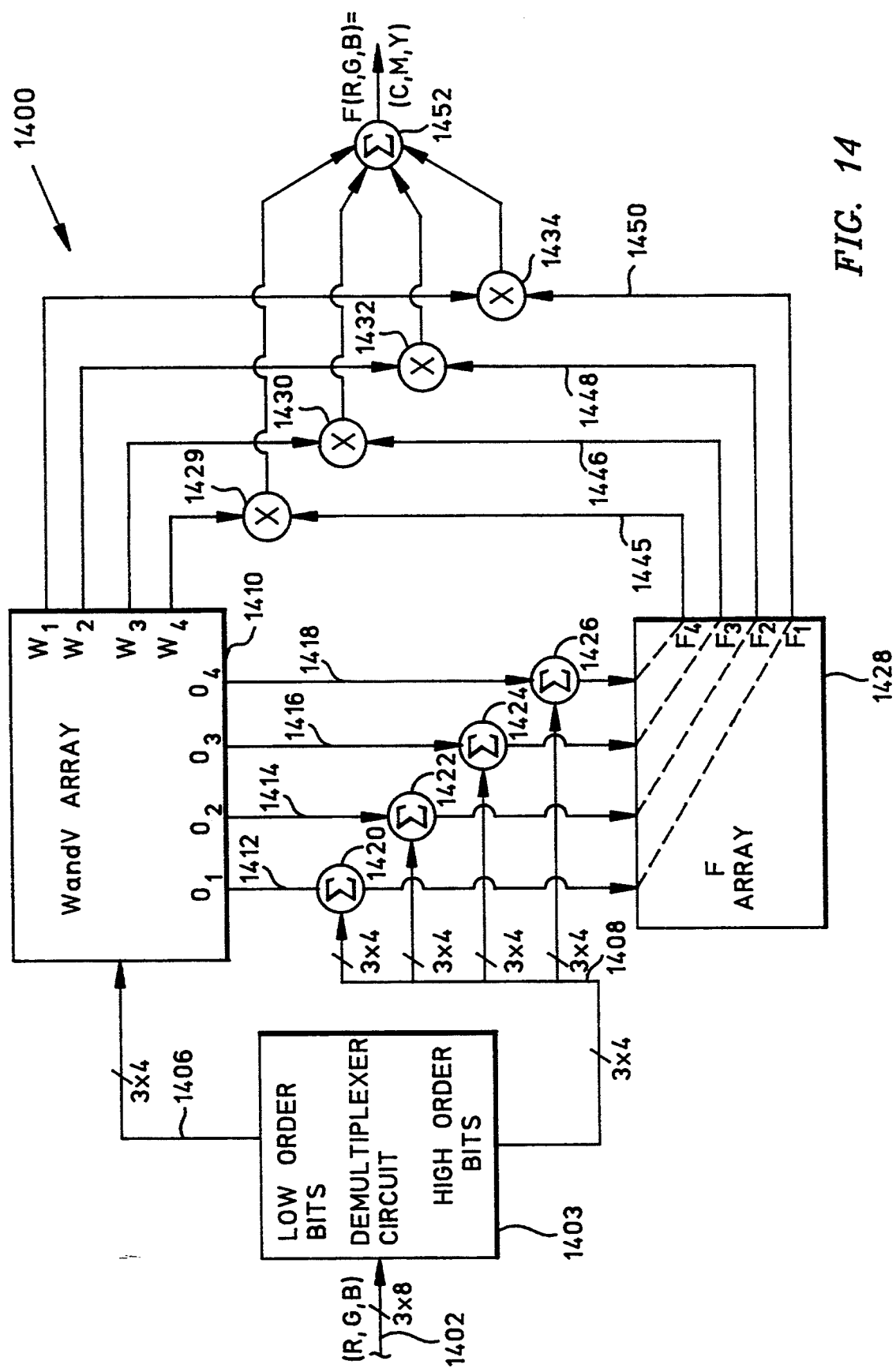
FIG. 14 is a block diagram of an arithmetic apparatus for approximating a function value according to the invention.

FIG. 14 is a functional block diagram showing an arithmetic apparatus 1400 for approximating a function value according to a preferred embodiment of the invention. The invention accepts an input at input line 1402 in the form of three 8-bit values. The 8-bit values represent the coordinates of an arbitrarily selected point P within the three-dimensional color space domain of red, green, and blue (RGB). This point is the domain input to a mathematical function which produces an output in the three-dimensional color space range of cyan, magenta and yellow (CMY).

The apparatus 1400 of FIG. 14 implements equation (1) by means of a series of operations to approximate the output of the mathematical function in CMY color space, given a function domain input point in RGB color space. The domain of RGB color space is divided into 4096 rectangular volumes (16×16×16), and each rectangular volume is further subdivided into 74 tetrahedra, as described in conjunction with Tables 1 and 2. The coordinates of the input point P are expressed in terms of RGG color space, such that, for example, the x coordinate denotes a value for red, the y coordinate denotes a value for green, and the z coordinate denotes a value for blue.

Upon receipt of an arbitrarily selected input point P at input line 1402 from within the domain of RGB color space, the 8-bit coordinates of the selected point are fed to a first demultiplexer circuit 1403 which separates the 8-bit value into four low-order bits denoted as $R_L$, $G_L$, and $B_L$, and four high-order bits denoted as $R_H$, $G_H$, and $B_H$. The bits $R_L$, $G_L$, $B_L$, $R_H$, $G_H$, and $B_H$ correspond to values $X_L$, $Y_L$, $Z_L$, $X_H$, $Y_H$, and $Z_H$, respectively, discussed above in conjunction with FIGS. 10 and 11 and equation (2).

The low-order bits traverse line 1406 and are used to index the second memory (WandV array) 1410 which was previously described with reference to FIG. 11. For each input value of $R_L$, $G_L$, and $B_L$, the WandV array 1410 outputs four additive constants $O_1$, $O_2$, $O_3$, and $O_4$, and four multiplicative constants $W_1$, $W_2$, $W_3$, and $W_4$. Additive constant $O_1$ is fed to a first input of a summer 1420 over line 1412. The second input of the summer 1420 receives the four high-order bits $R_H$, $G_H$, $B_H$ from the demultiplexer circuit 1403 over line 1408. In a similar manner, additive constant $O_2$ is fed to summer 1422 over line 1414, $O_3$ is fed to summer 1424 over line 1416, and $O_4$ is fed to summer 1426 over line 1418. Each summer 1422, 1424, and 1426 adds the respective additive constant $O_2$, $O_3$, or $O_4$ to the four high-order bits $R_H$, $G_H$, and $B_H$. All four high-order bits are conveyed to one input of each summer 1420, 1422, 1424, and 1426.

With reference to the data structure of FIG. 11, the $X_L$ axis 1104 of FIG. 11 represents the color red, and is indexed by respective values of $X_L$ at the output of the demultiplexer circuit 1403. In a similar manner, the $Y_L$ axis 1106 represents the color green, and is indexed by respective values of $Y_L$ at the output of the demultiplexer circuit 1403, and the $Z_L$ axis 1108 represents the color blue, and is indexed by respective values of $Z_L$ at the output of the demultiplexer circuit 1403.

The outputs from summers 1420, 1422, 1424, and 1426 are used to provide an index input for the first memory (F) array 1428. The data structure of the F array 1428 was described above with reference to FIG. 10. The first summer 1420 output indexes a first function value, $F_1$, from the F array 1428, the second summer 1422 output indexes a second function value, $F_2$, the third summer 1424 indexes a third function value, $F_3$, and the fourth summer 1426 indexes a fourth function value, $F_4$.

The first function value, $F_1$, is fed from the F array 1428 to a first input of a first multiplier 1434 over line 1450. Similarly, the second function value, $F_2$, is fed to a first input of a second multiplier 1432 over line 1448, the third function value, $F_3$, is fed to a first input of a third multiplier 1430 over line 1446, and the fourth function value, $F_4$, is fed to a first input of a fourth multiplier 1429 over line 1445. The first multiplicative constant, $W_1$, from the WandV array 1410 is fed to a second input of the first multiplier 1434. Likewise, the second multiplicative constant, $W_2$, is fed to a second input of the second multiplier 1432, the third multiplicative constant, $W_3$, is fed to a second input of the third multiplier 1430, and the fourth multiplicative constant, $W_4$, is fed to a second input of a fourth multiplier 1429.

The outputs of the first, second, third, and fourth multipliers 1434, 1432, 1430, and 1429, respectively, are inputted to a summer 1452. The output of summer 1452 represents the output of the arithmetic apparatus 1400. This output is in the form of a function range value representing specific quantities of the colors cyan, magenta and yellow in CMY color space. The function range value was approximated by the arithmetic apparatus 1400 through the application of a volumetric interpolation process to one or more domain input points in red-green-blue color space.

The function values contained within the F array 1428 take into account the results of empirical observations and measurements. The specific quantities of cyan, magenta and yellow inks required to match the color of a domain sample value in RGB space is experimentally determined for various domain sample values. The experimental results serve to characterize the relationship between input domain points and range output values for a generally complicated mathematical function. The experimentally characterized function is then used to generate the values which are to be placed into the F array 1428. Empirical observations are conducted because the quantities of the inks required to match a predetermined color are generally dependent upon the specific type of paper used. For a given set of interpolation constants, different end results would be obtained, depending upon whether the print media consisted of, for example, newspaper sheets, typing paper, or colored stationary.

Figure 15:
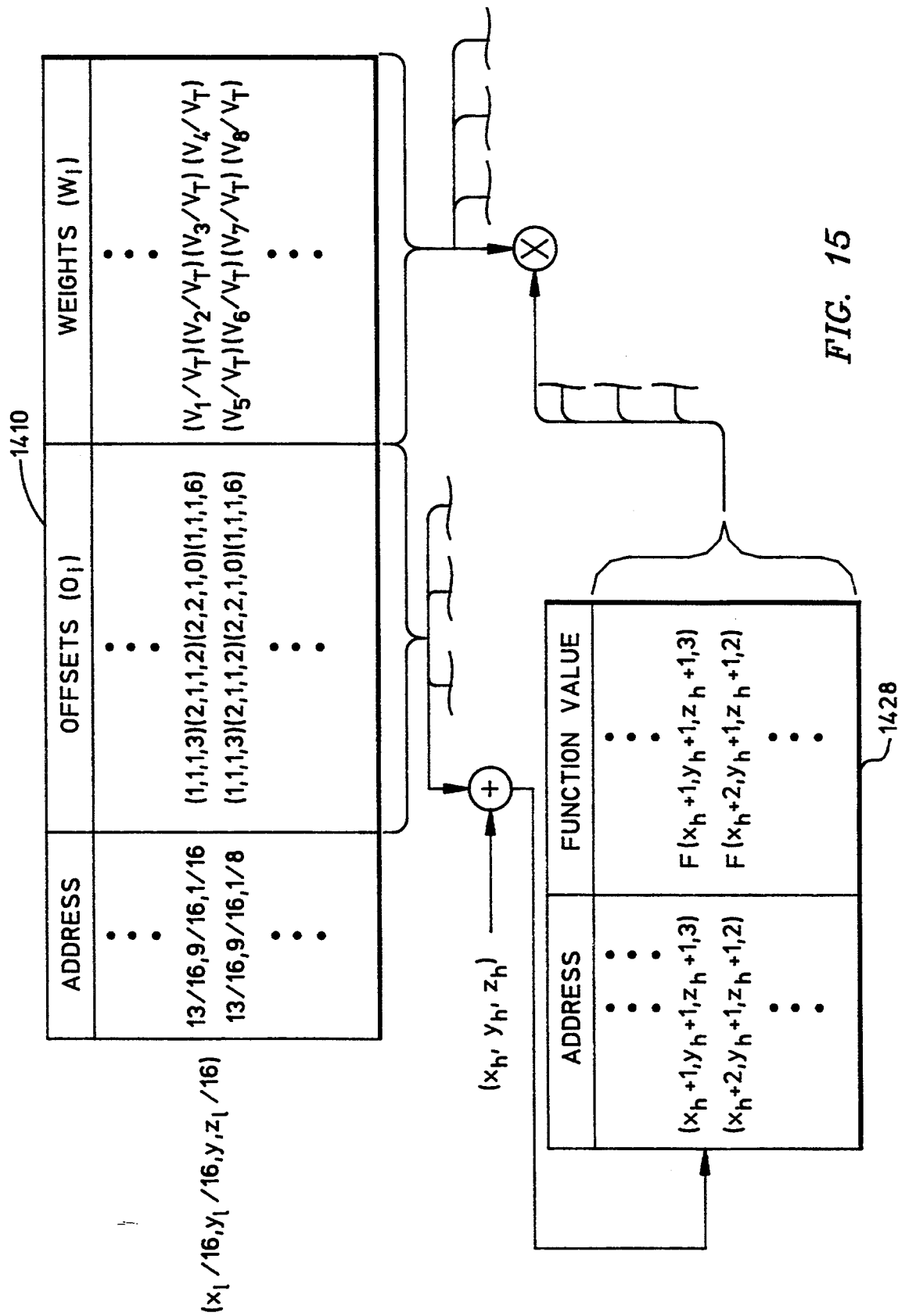
FIG. 15 is a diagram representing the contents of a WandV memory array in the apparatus of FIG. 14.

An example is now given which illustrates the structures of memory arrays 1410 and 1428. For an understanding of this example, refer to FIG. 15 and to Tables 1 and 2. Assume that the memory arrays 1410 and 1428 have been initialized as described above. Assume next that a multibit input color representation having RGB values of (77, 25, 17) is provided to the circuit of FIG. 14. Assume that the demultiplexer circuit 1403 of FIG. 14 scales these values, dividing each set of low order bits by 16. The results of demultiplexing and scaling are as follows:

Example
$(x,y,z) = (77,25,17)$
$x_H, y_H, z_H = (4,1,1)$
$x_L, y_L, z_L = (13,9,1)$
$x_L/16, y_L/16, z_L/16 = (13/16, 9/16, 1/16)$ With the scaling, the low-order bits represent a point p within or on the unit cube illustrated in FIG. 11. The addressing scheme uses the low order bits to determine the four vertices of a tetrahedron in the hexagonal, close packing structure which contains the point and which has one or more vertices in or on the unit cube. This tetrahedron, hereinafter termed the "sample" tetrahedron, is defined by the four triplets at entry 24 of Table 1. Each triplet represents the offsets from the origin of the unit cube to where a respective tetrahedron vertex is located. These triplets map to the left-hand column of Table 2. For example, the first triplet $(\frac{3}{4},\frac{1}{2},0)$ corresponds to entry number 6 in Table 2, that is $(x_H+\frac{3}{4}, y_H+\frac{1}{2}, z_H)$. Similarly, the second triplet matches to entry 7 in Table 2, the third to entry 10, and the fourth to entry 20. The right-hand column of Table 2 maps the origin of a unit cube in the input color space to a function value generated for the sample point corresponding to a the vertex of the sample tetrahedron. In this regard, the function value for vertex number 6 in Table 2 is the value stored at $(x_H+1, y_H+1, z_H+1, 3)$ in the first memory array 1428. Thus, the offset which must be stored in the WandV array 1410 is (1,1,1,3). The other three offsets necessary to determine the other three vertices of the sample tetrahedron are similarly determined and all offsets are entered into the WandV array 1410 as illustrated in FIG. 15. In addition, the ratios necessary to perform the interpolation according to equation (1) are calculated and stored with the offsets in the same order as the offsets. For example, the first ratio $(v_1/v_T)$ is obtained by dividing the volume of the sample tetrahedron $v_T$ into the volume $v_1$ of the sub-tetrahedron whose vertices are the point p and the three sample tetrahedron vertices corresponding to $(5/4,\frac{1}{2},0)$ (1,1,0) and $(1,\frac{3}{4},\frac{1}{2})$.

It is noted that the point p corresponding to the scaled low order bits 13/16, 9/16, 1/16 is contained in the unit cube of FIG. 11 and in a sample tetrahedron having only two vertices in the unit cube-$(\frac{3}{4},\frac{1}{2},2,0)$ and $(1,\frac{3}{4},\frac{1}{2})$. Each of the remaining vertices is in a respective unit cube adjacent the unit cube containing p.

The WandV array 14010 is thus loaded with precalculated offsets and weights for each of the possible points performed by scaling the low order bits. Assuming 8-bit values for the respective R, G, and B components of the input color, and assuming further that the low and high order numbers are 4 bits each, the WandV array will contain 4096 sets of offsets and weights.

The F array 1428 maps function values to vertex locations in the hexagonal, close-packing structure by the indexing scheme described above and illustrated in FIG. 15. Thus, the function value at the first vertex with offsets ((1,1,1,3) is stored in the F array 1428 at address $x_H+1, y_H+1, z_H+1, 3$. When addressed, the function value stored at this location is multiplied by the first weight $(v_1/v_T)$ which is simultaneously available from the WandV array 1410.

Figure 16:
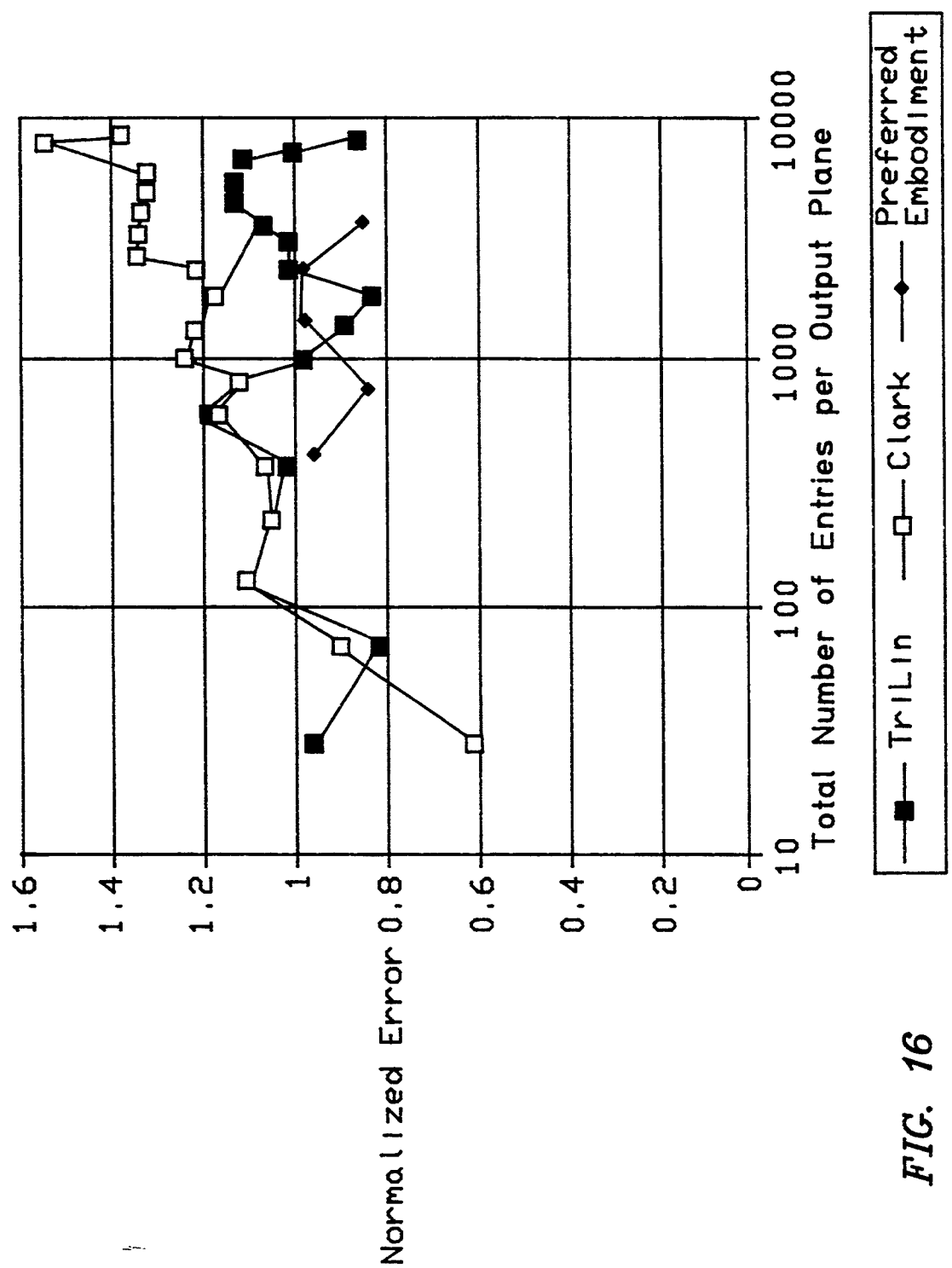
FIG. 16 is a graph showing the performance of a preferred embodiment of the present invention.

FIG. 16 is a graph showing the relationship between total number of entries per output plane versus normalized error for the function approximation method of the present invention. The graph was prepared using a function which provides output range values for three variables, such as cyan, magenta and yellow. The graph reveals the normalized errors in a single output plane for the method of the present invention, as well as for two prior art methods described above in the Background of the Invention. These prior art methods include trilinear interpolation and the interpolation method disclosed in the Clark patent. As stated above, the main shortcoming of the trilinear interpolation method is the relative lack of speed and efficiency, due to the number of mathematical calculations required. Although Clark provides for faster function approximation, the Clark method employs design tradeoffs in the area of approximation accuracy. Note that for the example function, the method of the present invention provides error rates significantly lower than those of the Clark method, and comparable to those of the trilinear interpolation method. In this manner, the invention combines the advantages of these prior art systems, i.e., approximation accuracy and efficiency, without sacrificing speed or error performance.

The results of FIG. 16 were prepared using an algorithm that tests the overall accuracy of function approximation methods by measuring the errors introduced by quantization and manipulation of an artificial image. The algorithm performs the following functions:

1. generating a constellation of test points in a standard visually-uniform color space;
2. converting these points to a source space, which consists of virtually any arbitrary color space one desires to study;
3. quantizing the points in the manner of a perfect analog-to-digital converter of adjustable precision;
4. converting the points to a target color space (which may be the source space); and
5. measuring the error Occurring between the result of the precise and the quantized conversions.

It is assumed that the actual images are pre-processed so that minimum and maximum values for each dimension of the color space are linearly mapped to plus and minus full scale of the quantizer. To provide a realistic simulation of this circumstance, a scan is performed through the constellation of test points to find the minimum and maximum values for each dimension, the input to the quantizer is normalized with the appropriate values, and the output is normalized before comparing with the precise conversion.

The test points are intended to represent the average of many scenes in the real world. To generate this artificial scene, reflectances spanning the range of colors naturally occurring in images of the real world were selected, illuminated at three intensities. The starting point was a cubical grid of points just within the gamut of real surface colors as described by Pointer, M. R., "The Gamut of Real Surface Colours," Color Research and Application, 5 (3), 145–155, Fall 1980. Pointer measured the color coordinates of 4089 nonflourescent samples, and determined the maximum chroma for a regular progression of lightness and hue-angle. The grid is 15 units on a side, resulting in 168 points.

The surfaces in the artificial scene are illuminated by three levels of lightening in a ratio of 1:3:10. Computation of the intensity of the reflected light is performed assuming the surface is normal to the imaging lens axis and the illumination is normal to the surface.

The methodology, for each table size, was to populate the table with accurate entries based on the mathematical relationships between the device-independent representation and the native device space under consideration, to convert a test image using both interpolation and exact methods, and to measure the statistics of the errors. This image contains points outside the gamut of the native device space under consideration. The accuracy of a translation of a point that could not be accurately rendered was of no interest, so all the points in the test image that were outside the device gamut were set to zero. This means that the out-of-gamut points affect the statistics only by making the average error appear somewhat smaller than it would be if the points of the corresponding dimension of the image that resulted after the out-of-gamut points were zeroed. The test case used the conversion of an image encoded in a format known as CIELAB to the standard RGB format appropriate for a monitor with XAll phosphors and a gamma of 2.2. The interpolation errors were measured, and show the average of the average error values in each normalized to a straight line fit to the trilinear interpolation results. The table size value is the total number of sample points (entries in array F) required for each technique, and the results for the disclosed process are indicated as the "preferred embodiment".

A number of specific embodiments of the invention have been described. Nevertheless, it will be understood that various modifications and changes may be made without departing from the spirit and scope of the invention. For example, a function domain may be divided and/or subdivided unequally. The unequal division can be implemented using automatic meshing techniques known to those skilled in the art. These meshing techniques are used to prepare data for analysis using the Finite Element Method of mathematical analysis, which is well known in the art. The method of the present invention may be applied to color image processing, and it may also be advantageously applied to other fields where it is desired to compute the value of a multivariable function. Accordingly, it is to be understood that the invention is not to be limited by the specific illustrated embodiments, but only by the scope of the appended claims.

TABLE 1

| | |
|---|---|
| 1. | <(0,0,0) (½,½,0) (½,½,0) (½,1/6,½)> |
| 2. | <(0,0,0) (½,½,0) (0,−½,½) (½,1/6,½)> |
| 3. | <(0,0,0) (−½,½,0) (½,½,0) (−½,1/6,½)> |
| 4. | <(0,0,0) (½,½,0) (−½,1/6,½) (½,1/6,½)> |
| 5. | <(0,0,0) (0,−½,½) (−½,1/6,½) (½,1/6,½)> |
| 6. | <(½,0,0) (1,0,0) (½,½,0) (½,1/6,½)> |
| 7. | <(½,0,0) (1,0,0) (½,−½,½) (½,1/6,½)> |
| 8. | <(½,0,0) (½,½,0) (½,½,0) (½,1/6,½)> |
| 9. | <(½,0,0) (½,½,0) (½,1/6,½) (½,1/6,½)> |
| 10. | <(½,0,0) (0,−½,½) (½,−½,½) (½,1/6,½)> |
| 11. | <(½,0,0) (½,−½,½) (½,1/6,½) (½,1/6,½)> |
| 12. | <(1,0,0) (½,½,0) (5/4,½,0) (½,1/6,½)> |
| 13. | <(1,0,0) (5/4,½,0) (½,1/6,½) (5/4,1/6,½)> |
| 14. | <(1,0,0) (½,−½,½) (1,−½,½) (½,1/6,½)> |
| 15. | <(1,0,0) (1,−½,½) (½,1/16,½) (5/4,1/6,½)> |
| 16. | <(−½,½,0) (½,½,0) (0,1,0) (0,⅔,½)> |
| 17. | <(−½,½,0) (½,½,0) (−½,1/6,½) (0,⅔,½)> |
| 18. | <(½,½,0) (½,½,0) (½,1,0) (½,⅔,½)> |
| 19. | <(½,½,0) (½,½,0) (½,1/6,½) (½,⅔,½)> |
| 20. | <(½,½,0) (0,1,0) (½,1,0) (0,⅔,½)> |
| 21. | <(½,½,0) (½,1,0) (0,⅔,½) (½,⅔,½)> |
| 22. | <(½,½,0) (−½,1/6,½) (½,1/6,½) (0,⅔,½)> |
| 23. | <(½,½,0) (½,1/6,½) (0,⅔,½) (½,⅔,½)> |
| 24. | <(½,½,0) (5/4,½,0) (1,1,0) (1,⅔,½)> |
| 25. | <(½,½,0) (5/4,½,0) (½,1/6,½) (1,⅔,½)> |
| 26. | <(½,½,0) (½,1,0) (1,1,0) (½,⅔,½)> |
| 27. | <(½,½,0) (1,1,0) (½,⅔,½) (1,⅔,½)> |
| 28. | <(½,½,0) (½,1/6,½) (½,1/6,½) (½,⅔,½)> |
| 29. | <(½,½,0) (½,1/6,½) (½,⅔,½) (1,⅔,½)> |
| 30. | <(5/4,½,0) (½,1/6,½) (5/4,1/6,½) (1,⅔,½)> |
| 31. | <(0,1,0) (½,1,0) (0,⅔,½) (½,7/6,½)> |
| 32. | <(0,1,0) (0,⅔,½) (−½,7/6,½) (½,7/6,½)> |
| 33. | <(½,1,0) (1,1,0) (½,⅔,½) (½,7/6,½)> |
| 34. | <(½,1,0) (0,⅔,½) (½,⅔,½) (½,7/6,½)> |
| 35. | <(½,1,0) (½,⅔,½) (½,7/6,½) (½,7/6,½)> |
| 36. | <(1,1,0) (½,⅔,½) (1,⅔,½) (½,7/6,½)> |
| 37. | <(1,1,0) (1,⅔,½) (½,7/6,½) (5/4,7/6,½)> |
| 38. | <(0,0,1) (0,−½,½) (−½,1/6,½) (½,1/6,½)> |
| 39. | <(0,0,1) (½,0,1) (0,−½,½) (½,1/16,½)> |
| 40. | <(0,0,1) (½,0,1) (½,½,1) (½,1/6,½)> |
| 41. | <(0,0,1) (−½,½,1) (½,½,1) (−½,1/6,½)> |
| 42. | <(0,0,1) (½,½,1) (−½,1/6,½) (½,1/6,½)> |
| 43. | <(½,0,1) (0,−½,½) (½,−½,½) (½,1/6,½)> |
| 44. | <(½,0,1) (½,−½,½) (½,1/6,½) (½,1/6,½)> |
| 45. | <(½,0,1) (1,0,1) (½,−½,½) (½,1/6,½)> |
| 46. | <(½,0,1) (1,0,1) (½,½,1) (½,1/6,½)> |
| 47. | <(½,0,1) (½,½,1) (½,½,1) (½,1/6,½)> |
| 48. | <(½,0,1) (½,½,1) (½,1/6,½) (½,1/6,½)> |
| 49. | <(1,0,1) (½,−½,½) (1,−½,½) (½,1/6,½)> |
| 50. | <(1,0,1) (1,−½,½) (½,1/6,½) (5/4,1/6,½)> |
| 51. | <(1,0,1) (½,½,1) (5/4,½,1) (½,1/6,½)> |
| 52. | <(1,0,1) (5/4,½,1) (½,1/6,½) (5/4,1/6,½)> |
| 53. | <(−½,½,1) (½,½,1) (−½,1/6,½) (0,⅔,½)> |
| 54. | <(−½,½,1) (½,½,1) (0,1,1) (0,⅔,½)> |
| 55. | <(½,½,1) (½,½,1) (1,1,1) (½,⅔,½)> |
| 56. | <(½,½,1) (½,½,1) (½,1/6,½) (½,⅔,½)> |
| 57. | <(½,½,1) (0,1,1) (½,1,1) (0,⅔,½)> |
| 58. | <(½,½,1) (½,1,1) (0,⅔,½) (½,⅔,½)> |
| 59. | <(½,½,1) (−½,1/6,½) (½,1/6,½) (0,⅔,½)> |
| 60. | <(½,½,1) (½,1/6,½) (0,⅔,½) (½,⅔,½)> |

TABLE 1-continued

| 61. | $<(\frac{3}{4},\frac{1}{2},1)\ (5/4,\frac{1}{2},1)\ (1,1,1)\ (1,\frac{3}{2},\frac{1}{2})>$ |
|---|---|
| 62. | $<(\frac{3}{4},\frac{1}{2},1)\ (5/4,\frac{1}{2},1)\ (\frac{3}{4},1/6,\frac{1}{2})\ (1,\frac{3}{2},\frac{1}{2})>$ |
| 63. | $<(\frac{3}{4},\frac{1}{2},1)\ (\frac{1}{2},1,1)\ (1,1,1)\ (\frac{1}{2},\frac{3}{2},\frac{1}{2})>$ |
| 64. | $<(\frac{3}{4},\frac{1}{2},1)\ (1,1,1)\ (\frac{1}{2},\frac{3}{2},\frac{1}{2})\ (1,\frac{3}{2},\frac{1}{2})>$ |
| 65. | $<(\frac{3}{4},\frac{1}{2},1)\ (\frac{3}{4},1/6,\frac{1}{2})\ (\frac{3}{4},1/6,\frac{1}{2})\ (\frac{1}{2},\frac{3}{2},\frac{1}{2})>$ |
| 66. | $<(\frac{3}{4},\frac{1}{2},1)\ (\frac{3}{4},1/6,\frac{1}{2})\ (\frac{1}{2},\frac{3}{2},\frac{1}{2})\ (1,\frac{3}{2},\frac{1}{2})>$ |
| 67. | $<(5/4,\frac{1}{2},1)\ (\frac{3}{4},1/6,\frac{1}{2})\ (5/4,1/6,\frac{1}{2})\ (1,\frac{3}{2},\frac{1}{2})>$ |
| 68. | $<(0,1,1)\ (\frac{1}{2},1,1)\ (0,\frac{3}{2},\frac{1}{2})\ (\frac{1}{4},7/6,\frac{1}{2})>$ |
| 69. | $<(0,1,1)\ (0,\frac{3}{2},\frac{1}{2})\ (-\frac{1}{4},7/6,\frac{1}{2})\ (\frac{1}{4},7/6,\frac{1}{2})>$ |
| 70. | $<(\frac{1}{2},1,1)\ (1,1,1)\ (\frac{1}{2},\frac{3}{2},\frac{1}{2})\ (\frac{1}{4},7/6,\frac{1}{2})>$ |
| 71. | $<(\frac{1}{2},1,1)\ (0,\frac{3}{2},\frac{1}{2})\ (\frac{1}{2},\frac{3}{2},\frac{1}{2})\ (\frac{1}{4},7/6,\frac{1}{2})>$ |
| 72. | $<(\frac{1}{2},1,1)\ (\frac{1}{2},\frac{3}{2},\frac{1}{2})\ (\frac{3}{4},7/6,\frac{1}{2})\ (\frac{1}{4},7/6,\frac{1}{2})>$ |
| 73. | $<(1,1,1)\ (\frac{1}{2},\frac{3}{2},\frac{1}{2})\ (1,\frac{3}{2},\frac{1}{2})\ (\frac{3}{4},7/6,\frac{1}{2})>$ |
| 74. | $<(1,1,1)\ (1,\frac{3}{2},\frac{1}{2})\ (\frac{3}{4},7/6,\frac{1}{2})\ (5/4,7/6,\frac{1}{2})>$ |

TABLE 2

| 1. | $(x_H, y_H, z_H)$ | $F(x_H+1, y_H+1, z_H+1, 0)$ |
|---|---|---|
| 2. | $(x_H+\frac{1}{2}y_H, z_H)$ | $F(x_H+1, y_H+1, z_H+1, 1)$ |
| 3. | $(x_3+1, y_H, z_H)$ | $F(x_H+2, y_H+1, z_H+1, 0)$ |
| 4. | $(x_H-\frac{1}{4}, y_H+\frac{1}{2}, z_H)$ | $F(x_H, y_H+1, z_H+1, 3)$ |
| 5. | $(x_H+\frac{1}{4}, y_H+\frac{1}{2}, z_H)$ | $F(x_H+1, y_H+1, z_H+1, 2)$ |
| 6. | $(x_H+\frac{3}{4}, y_H+\frac{1}{2}, z_H)$ | $F(x_H+1, y_H+1, z_H+1, 3)$ |
| 7. | $(x_H+5/4, y_H+\frac{1}{2}, z_H)$ | $F(x_H+2, y_H+1, z_H+1, 2)$ |
| 8. | $(x_H, y_H+1, z_H)$ | $F(x_H+1, y_H+2, z_H+1, 0)$ |
| 9. | $(x_H+\frac{1}{2}, y_H+1, z_H)$ | $F(x_H+1, y_H+2, z_H+1, 1)$ |
| 10. | $(x_H+1, y_H+1, z_H)$ | $F(x_H+2, y_H+2, z_H+1, 0)$ |
| 11. | $(x_H, y_H-\frac{1}{3}, z_H+\frac{1}{2})$ | $F(x_H+1, y_H, z_H+1, 6)$ |
| 12. | $(x_H+\frac{1}{2}, y_H-\frac{1}{3}, z_H+\frac{1}{2})$ | $F(x_H+1, y_H+1, z_H+1, 7)$ |
| 13. | $(x_H+1, y_H-\frac{1}{3}, z_H+\frac{1}{2})$ | $F(x_H+2, y_H, z_H+1, 6)$ |
| 14. | $(x_H-\frac{1}{4}, y_H+1/6, z_H+\frac{1}{2})$ | $F(x_H, y_H+1, z_H+1, 5)$ |
| 15. | $(x_H+\frac{1}{4}, y_H+1.5, z_H+\frac{1}{2})$ | $F(x_H+1, y_H+1, z_H+1, 4)$ |
| 16. | $(x_H+\frac{3}{4}, y_H+1/6, z_H+\frac{1}{2})$ | $F(x_H+1, y_H+1, z_H+1, 5)$ |
| 17. | $(x_H+5/4, y_H+1/6, z_H+\frac{1}{2})$ | $F(x_H+2, y_H+1, z_H+1, 4)$ |
| 18. | $(x_H, y_H+\frac{2}{3}, z_H+\frac{1}{2})$ | $F(x_H+1, y_H+1, z_H+1, 6)$ |
| 19. | $(x_H+\frac{1}{2}, y_H+\frac{2}{3}, z_H+\frac{1}{2})$ | $F(x_H+1, y_H+1, z_H+1, 7)$ |
| 20. | $(x_H+1, y_H+\frac{2}{3}, z_H+\frac{1}{2})$ | $F(x_H+2, y_H+1, z_H+1, 6)$ |
| 21. | $(x_H-\frac{1}{4}, y_H+7/6, z_H+\frac{1}{2})$ | $F(x_H, y_H+2, z_H+1, 5)$ |
| 22. | $(x_H+\frac{1}{4}, y_H+7/6, z_H+\frac{1}{2})$ | $F(x_H+1, y_H+2, z_H+1, 4)$ |
| 23. | $(x_H+\frac{3}{4}, y_H+7/6, z_H+\frac{1}{2})$ | $F(x_H+1, y_H+2, z_H+1, 5)$ |
| 24. | $(x_H+5/4, y_H+7/6, z_H+\frac{1}{2})$ | $F(x_H+2, y_H+2, z_H+1, 4)$ |
| 25. | $(x_H, y_H, z_H+1)$ | $F(x_H+1, y_H+1, z_H+2, 0)$ |
| 26. | $(x_H+\frac{1}{2}, y_H, z_H+1)$ | $F(x_H+1, y_H+1, z_H+2, 1)$ |
| 27. | $(x_H+1, y_H, z_H+1)$ | $F(x_H+2, y_H+1, z_H+2, 0)$ |
| 28. | $(x_H-\frac{1}{4}, y_H+\frac{1}{2}, z_H+1)$ | $F(x_H, y_H+1, z_H+2, 3)$ |
| 29. | $(x_H+\frac{1}{4}, y_H+\frac{1}{2}, z_H+1)$ | $F(x_H+1, y_H+1, z_H+2, 2)$ |
| 30. | $(x_H+\frac{3}{4}, y_H+\frac{1}{2}, z_H+1)$ | $F(x_H+1, y_H+1, z_H+2, 3)$ |
| 31. | $(x_H+5/4, y_H+\frac{1}{2}, z_H+1)$ | $F(x_H+2, y_H+1, z_H+2, 2)$ |
| 32. | $(x_H, y_H+1, z_H+1)$ | $F(x_H+1, y_H+2, z_H+2, 0)$ |
| 33. | $(x_H+\frac{1}{2}, y_H+1, z_H+1)$ | $F(x_H+1, y_H+2, z_H+2, 1)$ |
| 34. | $(x_H+1, y_H+1, z_H+1)$ | $F(x_H+2, y_H+2, z_H+2, 0)$ |

We claim:

1. In a system for converting an input color signal to an output color signal using a function relating an input domain including a plurality of sample color values in a first 3-dimensional color space to a plurality of function color values in an output range of a second m-dimensional color space, the system including processing means for calculating values, a memory means for storing values, and an output device, a method executable on the system for approximating an output color signal value in the second color space in response to an input color signal value in the first color space, the method comprising the steps of:

subdividing the first color space such that the sample color values are vertices of tetrahedra which form a hexagonal, close-packing structure;

generating function color values in response to the sample color values such that each function color value corresponds to a respective sample color value;

storing the function color values in a function memory array such that each function value is addressed in the function memory array by an address including a base address corresponding to a rectangular solid in the first color space;

generating a plurality of information sets and storing the information sets in a second memory array, wherein each information set includes:

4 offsets from a predetermined point of a unit rectangular space in the first color space to respective vertices of a sample tetrahedron in the hexagonal, close-packed structure which is at least partially in the unit rectangular space; and 4 weight values, each weight value corresponding to a respective offset value and each weight value equalling a ratio of a volume of a second tetrahedron contained in the sample tetrahedron, the second tetrahedron including three vertices of the sample tetrahedron and a fourth vertex which is a point in, or on a surface of, the sample tetrahedron;

each set of offset and weight values being stored in the second memory array at an address location corresponding to a point in, or on the surface of, the unit rectangular space;

providing an image pixel including a multi-bit representation of a point p in the first color space representing an input color signal value;

producing from the second memory array a set of offset and weight values for a sample tetrahedron enclosing a point corresponding to low-order bits of the multi-bit representation;

producing from the first memory array function values which correspond to sample color values at our vertices of a tetrahedron in the hexagonal, close-packed structure in which p is located, the function values being produced in response to an address formed by combining the offsets produced from the second memory array and high order bits of the multi-bit representation;

producing as an output color signal value an approximation of a function value which corresponds to p by combining the function values with the weights according to an interpolation procedure; and generating an output color on the output device in response to the output color signal value.

2. The method of claim 1, wherein the step of subdividing includes:

first, subdividing the first color space into non-overlapping, rectangular spaces; and second, subdividing the first color space into substantially regular, non-overlapping tetrahedra, each tetrahedron including four vertices, each vertex corresponding to a respective sample color value.

3. In a system for converting an input color to an output color using a function relating an input domain including a plurality of points in a first three-dimensional color space to a corresponding plurality of values in an output range in a second m-dimensional color space, a method for approximating a value corresponding to a point representing an input color, the method being executable on a machine including memory means, processing means, and an output device the method comprising the following steps:

(a) subdividing the function domain into a plurality of three-dimensional rectangular solids defined by a plurality of planes of constant value for each of three dimensions of the three-dimensional color space;

(b) subdividing the function domain into a plurality of three-dimensional tetrahedral solids and three-dimensional octahedral solids defined by projecting a plurality of planar grids of points into the three-dimensional color space, the plurality of planar grids including first planar grids and second planar grids, the planar grids alternating in three-dimensional space such that a first planar grid is projected into the space between any two second planar grids and a second planar grid is projected into the space between any two first planar grids, the first planar grids being constructed by the steps of:

(1) including the points with (x,y,z) coordinates (i,j*sqrt(3)) for every integer i and j;

(2) including the points with (x,y) coordinates (i+½,j*sqrt(3)+sqrt(3)/2) for every integer i and j;

and the second planar grid being constructed by the steps of:

(1) including the points with (x,y) coordinates (i+½,j*sqrt(3)) for every integer i and j;

(2) including the points with (x,y) coordinates (i,j*sqrt(3)+sqrt(3)/2) for every integer i and j;

(c) restricting the points to be the points of the planar grids that are part of a tetrahedron such that the interior of the tetrahedron contains points of the input domain;

(d) determining function values corresponding to the sample points and storing the function values in a memory array;

(e) providing an image pixel including an input color signal representing a target evaluation point situated within the function domain;

(f) extracting a plurality of sample points for approximating a function value representing an output color signal and corresponding to the target evaluation point, the extraction step including:

(1) identifying a sample tetrahedron containing the target evaluation point on its surface or in its interior; and (2) retrieving from the memory array, the function values corresponding to the vertices of the sample tetrahedron;

(g) approximating the function value at the target evaluation point from the vertices of the sample tetrahedron and the function values corresponding to vertices of the sample tetrahedron, by a volumetric interpolation method;

(h) and, generating an output color on the output device in response to the function value.

4. A method for approximating the value of a function as set forth in claim 3 wherein step b includes:

(b.1) creating a plurality of points with coordinates (x/2,y/sqrt(3),z) where z is an integer and the point (x,y) is in layer 1;

(b.2) creating a plurality of points with coordinates (x/2,y/sqrt(3), z+½) where z is an integer and the point (x,y) is in layer 2;

5. A method for approximating the value of a function as set forth in claim 3 wherein step b includes the steps:

(b.1) creating a plurality of points with coordinates (x/6,y/sqrt(27),z) where z is an integer and the point (x,y) is in layer 1;

(b.2) creating a plurality of points with coordinates (x/6,y/sqrt(27)+1/18,z+1/6) where z is an integer and the point (x,y) is in layer 2;

(b.3) creating a plurality of points with coordinates (x/6,y/sqrt(27)+1/9,z+⅓) where z is an integer and the point (x,y) is in layer 1;

(b.4) creating a plurality of points with coordinates (x/6,y/sqrt(27)+1/6,z+½) where z is an integer and the point (x,y) is in layer 2;

(b.5) creating a plurality of points with coordinates (x/6,y/sqrt(27)+2/9,z+⅔) where z is an integer and the point (x,y) is in layer 1; and (b.6) creating a plurality of points with coordinates (x/6,y/sqrt(27)+5/18,z+5/6) where z is an integer and the point (x,y) is in layer 2.

6. A method for approximating the value of a function as set forth in claim 3 wherein step (f) further includes the steps of:

(f.1) determining whether or not the target evaluation point is totally enclosed within a sample tetrahedron within the function domain;

(f.2) if the target evaluation point is enclosed in the sample tetrahedron, then retrieving four vertices of the sample tetrahedron;

(f.3) if the target evaluation point is not enclosed in the sample tetrahedron, then determining whether or not the target evaluation point (r,s,t) lies on a face of a sample tetrahedral volume within the function domain;

(f.4) if the target evaluation point lies on the face of the sample tetrahedron, then retrieving four vertices of any tetrahedra sharing the face of the sample tetrahedron;

(f.5) if the target evaluation point does not lie on the face of the sample tetrahedron, then determining whether or not the target evaluation point is one of the vertices of a sample tetrahedron; or (f.6) if the target evaluation point is a vertex of a sample tetrahedron, then retrieving four vertices of any one of the tetrahedra which share the vertex.

7. An arithmetic apparatus for converting an input color signal to an output color signal using a function having an input domain in a first three-dimensional color space and an output range in a second m-dimensional color space, the apparatus comprising:

an input port means for accepting an image pixel including a plurality of input color signal bits representing a set of coordinates x, y, and z, such that x represents a first color component in the first color space, y represents a second color component in the first color space, and z represents a third color component in the first color space, the plurality of bits including a plurality of high order bits and a plurality of low order bits;

demultiplexer means coupled to the input port means for separating the plurality of bits into said plurality of high order bits and said plurality of low order bits, the low order bits being conveyed to a first output terminal of the demultiplexer means and the high order bits being conveyed to a second output terminal of the demultiplexer means;

weights and vertices array means coupled to the first output terminal of the demultiplexer means for producing an output consisting of first, second, third, and fourth additive constants, and first, second, third, and fourth multiplicative constants, in response to the receipt of the low order bits;

first summation means coupled to the weights and vertices array means and to the second output terminal of the demultiplexer means for producing a first index value as the arithmetic sum of the first additive constant and the high order bits, a second index value as the arithmetic sum of the second additive constant and the high order bits, a third index value as the arithmetic sum of the third additive constant and the high order bits, and a fourth index value as the arithmetic sum of the fourth additive constant and the high order bits;

function value array means coupled to the first summer means for producing an output consisting of first, second, third, and fourth function values in response to the receipt of the first, second, third, and fourth index values, respectively;

multiplexer means coupled to the weights and vertices array means and to the function value means for calculating a first product as the mathematical product of the first function value and the first multiplicative constant, a second product as the mathematical product of the second function value and the second multiplicative constant, a third product as the mathematical product of the third function value and the third multiplicative constant, and a fourth product as the mathematical product of the fourth function value and the fourth multiplicative constant;

second summation means coupled to the multiplier means for calculating an output sum as the arithmetic sum of the first product, the second product, the third product, and the fourth product, the output sum representing an approximation for a range output value v of the function in the second m-dimensional color space; and an output device connected to the second summation means to generate an output color in response to the output sum.

* * * * *

UNITED STATES PATENT AND TRADEMARK OFFICE
CERTIFICATE OF CORRECTION

PATENT NO.   : 5,390,035
DATED        : February 14, 1995
INVENTOR(S)  : Kasson et al.

It is certified that error appears in the above-indentified patent and that said Letters Patent is hereby corrected as shown below:

Column 26, line 33, please change "our" to --four--

Signed and Sealed this

Twenty-third Day of May, 1995

Attest:

BRUCE LEHMAN

*Attesting Officer*        *Commissioner of Patents and Trademarks*